(12) United States Patent
Tatsuta et al.

(10) Patent No.: US 11,758,945 B2
(45) Date of Patent: Sep. 19, 2023

(54) POWER SUPPLY UNIT FOR AEROSOL INHALER

(71) Applicant: JAPAN TOBACCO INC., Tokyo (JP)

(72) Inventors: Nobuhiro Tatsuta, Tokyo (JP); Hajime Fujita, Tokyo (JP)

(73) Assignee: JAPAN TOBACCO INC., Tokyo (JP)

(*) Notice: Subject to any disclaimer, the term of this patent is extended or adjusted under 35 U.S.C. 154(b) by 150 days.

(21) Appl. No.: 17/088,585

(22) Filed: Nov. 4, 2020

(65) Prior Publication Data

US 2021/0127746 A1    May 6, 2021

(30) Foreign Application Priority Data

Nov. 5, 2019  (JP) ................. 2019-201067

(51) Int. Cl.

| | | |
|---|---|---|
| *A24F 40/50* | (2020.01) | |
| *H02J 50/12* | (2016.01) | |
| *H02J 50/40* | (2016.01) | |
| *H02J 50/00* | (2016.01) | |
| *A24F 40/90* | (2020.01) | |
| *A24F 40/40* | (2020.01) | |
| *H02J 7/04* | (2006.01) | |

(Continued)

(52) U.S. Cl.
CPC .............. *A24F 40/50* (2020.01); *A24F 40/40* (2020.01); *A24F 40/90* (2020.01); *H02J 7/04* (2013.01); *H02J 50/005* (2020.01); *H02J 50/12* (2016.02); *H02J 50/40* (2016.02); *A24F 40/10* (2020.01); *A24F 40/20* (2020.01); *A24F 40/30* (2020.01); *H02J 2207/20* (2020.01)

(58) Field of Classification Search
CPC .......... A24F 40/50; A24F 40/40; A24F 40/90; A24F 40/10; A24F 40/20; A24F 40/30; H02J 7/04; H02J 50/005; H02J 50/12; H02J 50/40; H02J 2207/20
See application file for complete search history.

(56) References Cited

U.S. PATENT DOCUMENTS

| | | | |
|---|---|---|---|
| 5,982,149 A | * | 11/1999 | Shih ................. H02J 7/0031 320/128 |
| 9,698,605 B2 | | 7/2017 | Kanagawa et al. |

(Continued)

FOREIGN PATENT DOCUMENTS

| | | |
|---|---|---|
| CN | 107046331 A | 8/2017 |
| JP | 2005-110399 A | 4/2005 |

(Continued)

OTHER PUBLICATIONS

European search report dated Jan. 18, 2021, in corresponding European patent Application No. 20205393.0, 5 pages.

(Continued)

*Primary Examiner* — Daniel Kessie
*Assistant Examiner* — Brian K Baxter
(74) *Attorney, Agent, or Firm* — XSENSUS LLP

(57) ABSTRACT

A power supply unit for an aerosol inhaler includes: a power supply capable of supplying power to a load capable of generating aerosol from an aerosol source; and a housing accommodating the power supply, in which the housing accommodates at least one power reception coil capable of receiving the power in a wireless manner in both a case where the housing is placed horizontally and a case where the housing is placed vertically.

11 Claims, 17 Drawing Sheets

(51) Int. Cl.
    *A24F 40/10* (2020.01)
    *A24F 40/20* (2020.01)
    *A24F 40/30* (2020.01)

(56) References Cited

U.S. PATENT DOCUMENTS

| | | |
|---|---|---|
| 9,901,117 B2 | 2/2018 | Levitz et al. |
| 10,291,083 B2 | 5/2019 | Shimizu |
| 10,447,090 B1* | 10/2019 | Abdolkhani .......... H02M 7/219 |
| 2005/0068009 A1 | 3/2005 | Aoki |
| 2009/0096413 A1* | 4/2009 | Partovi ............... H01F 27/2804 |
| | | 320/108 |
| 2011/0265806 A1 | 11/2011 | Alarcon et al. |
| 2013/0298922 A1 | 11/2013 | Xiang et al. |
| 2013/0300350 A1 | 11/2013 | Xiang |
| 2014/0224267 A1* | 8/2014 | Levitz .................... H02J 50/90 |
| | | 320/108 |
| 2014/0232330 A1* | 8/2014 | Robertson ............... H02J 50/12 |
| | | 320/108 |
| 2015/0053214 A1 | 2/2015 | Alarcon et al. |
| 2015/0059779 A1 | 3/2015 | Alarcon et al. |
| 2015/0237918 A1 | 8/2015 | Liu |
| 2015/0333561 A1* | 11/2015 | Alarcon ................ H02J 7/0042 |
| | | 131/329 |
| 2016/0006259 A1 | 1/2016 | Ogawa et al. |
| 2017/0033615 A1* | 2/2017 | Asanuma ............ H02J 7/00304 |
| 2017/0196269 A1 | 7/2017 | Bemauer et al. |
| 2017/0214278 A1* | 7/2017 | Hosotani ............... H02J 50/12 |
| 2017/0244289 A1 | 8/2017 | Shimizu |
| 2018/0140021 A1 | 5/2018 | Alarcon et al. |
| 2018/0146712 A1 | 5/2018 | Alarcon et al. |
| 2018/0192709 A1 | 7/2018 | Alarcon et al. |
| 2018/0233940 A1* | 8/2018 | Jeong .................... H02J 50/12 |
| 2018/0233967 A1* | 8/2018 | Peralta ................. H04B 5/0081 |
| 2018/0241251 A1* | 8/2018 | Nomura ................. B60L 53/39 |
| 2018/0242645 A1 | 8/2018 | Alarcon et al. |
| 2018/0271156 A1 | 9/2018 | Alarcon et al. |
| 2018/0287435 A1* | 10/2018 | Wilson .................... H02J 50/90 |
| 2019/0207422 A1* | 7/2019 | Dani ....................... A24F 40/40 |
| 2019/0297947 A1 | 10/2019 | Bessant et al. |
| 2020/0044482 A1* | 2/2020 | Partovi .................. H02J 50/12 |
| 2020/0196670 A1 | 6/2020 | Alarcon et al. |
| 2020/0229502 A1 | 7/2020 | Akao |
| 2020/0229503 A1 | 7/2020 | Akao |
| 2020/0229504 A1 | 7/2020 | Akao |
| 2020/0229505 A1 | 7/2020 | Akao |
| 2020/0233444 A1 | 7/2020 | Akao |
| 2020/0235599 A1 | 7/2020 | Akao |
| 2020/0235600 A1 | 7/2020 | Akao |
| 2020/0275711 A9 | 9/2020 | Alarcon et al. |
| 2020/0346562 A1* | 11/2020 | Oda ....................... B60R 16/033 |
| 2021/0344229 A1* | 11/2021 | Nakao ................... H02J 50/402 |

FOREIGN PATENT DOCUMENTS

| | | |
|---|---|---|
| JP | 2011-125138 A | 6/2011 |
| JP | 5767342 B2 | 8/2015 |
| JP | 2016-019337 A | 2/2016 |
| JP | 6102946 B2 | 3/2017 |
| JP | 2017-148965 A | 8/2017 |
| JP | 6326188 B2 | 5/2018 |
| JP | 2018-126355 A | 8/2018 |
| JP | 2019-510469 A | 4/2019 |
| JP | 6557433 B1 | 8/2019 |
| WO | 2015/137815 A1 | 9/2015 |

OTHER PUBLICATIONS

Notice of Reasons for Refusal received for Japanese Patent Application No. 2019-201067, dated Nov. 26, 2019, 12 page including English Translation.

Notice of Reasons for Refusal received for Japanese Patent Application No. 2019-201067, dated Feb. 25, 2020, 14 pages including English Translation.

* cited by examiner

POWER SUPPLY UNIT FOR AEROSOL INHALER

CROSS REFERENCE TO RELATED APPLICATIONS

This application claims priority to Japanese Patent Application No. 2019-201067 filed on Nov. 5, 2019, the content of which is incorporated herein by reference.

TECHNICAL FIELD

The present invention relates to a power supply unit for an aerosol inhaler.

BACKGROUND ART

An aerosol inhaler capable of wireless charging and a power supply unit for the aerosol inhaler are known (U.S. Pat. No. 9,901,117 B, US 2015/0333561 A, JP 5767342 B, JP 6326188 B, JP 2018-126355 A, JP 2019-510469 T). The aerosol inhaler and the power supply unit for the aerosol inhaler may be placed in a vertically oriented posture (hereinafter referred to as "vertical placement" as appropriate) on a desk at work or a desk at home, may be placed in a horizontally oriented posture (hereinafter referred to as "horizontal placement" as appropriate) in a dedicated room or the like where the aerosol inhaler can be used, or may be placed in a plurality of postures. "Vertically" means that a longitudinal direction is placed in a substantially vertical direction, and "horizontally" means that the longitudinal direction is placed in a substantially horizontal direction.

In the power supply unit for the aerosol inhaler capable of wireless charging, it is desired that a power supply can be charged regardless of the posture of the housing. In the related-art power supply unit for the aerosol inhaler, a user needs to care about an orientation of the housing, and there is room for improvement in convenience in charging the power supply in a wireless manner.

An object of the present invention is to provide a power supply unit for an aerosol inhaler capable of improving convenience in charging a power supply in a wireless manner.

SUMMARY OF INVENTION

According to an aspect of the present invention, a power supply unit for an aerosol inhaler includes: a power supply capable of supplying power to a load capable of generating aerosol from an aerosol source; and a housing configured to accommodate the power supply, in which the housing accommodates at least one power reception coil capable of receiving the power in a wireless manner in both a case where the housing is placed horizontally and a case where the housing is placed vertically.

DESCRIPTION OF EMBODIMENTS

Hereinafter, a power supply unit for an aerosol inhaler and the aerosol inhaler according to each embodiment of the present invention will be described.

(Aerosol Inhaler)

Figure 1:
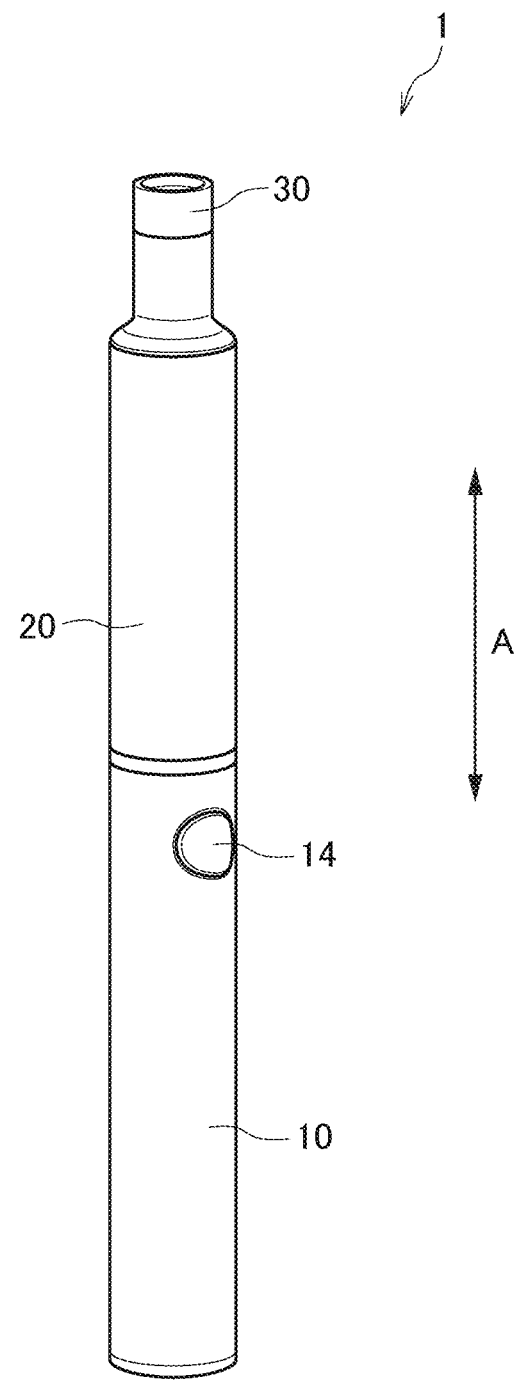
FIG. 1 is a perspective view of an aerosol inhaler equipped with a power supply unit according to an embodiment of the present invention.

An aerosol inhaler 1 is a device for inhaling a flavor without combustion, and has a rod shape extending along a predetermined direction (hereinafter referred to as a longitudinal direction A). As shown in FIG. 1, the aerosol inhaler 1 is provided with a power supply unit 10, a first cartridge 20 and a second cartridge 30 in this order along the longitudinal direction A. The first cartridge 20 is attachable to and detachable from the power supply unit 10, and the second cartridge 30 is attachable to and detachable from the first cartridge 20. In other words, the first cartridge 20 and the second cartridge 30 are replaceable.

First Embodiment (Power Supply Unit)

Figure 2:
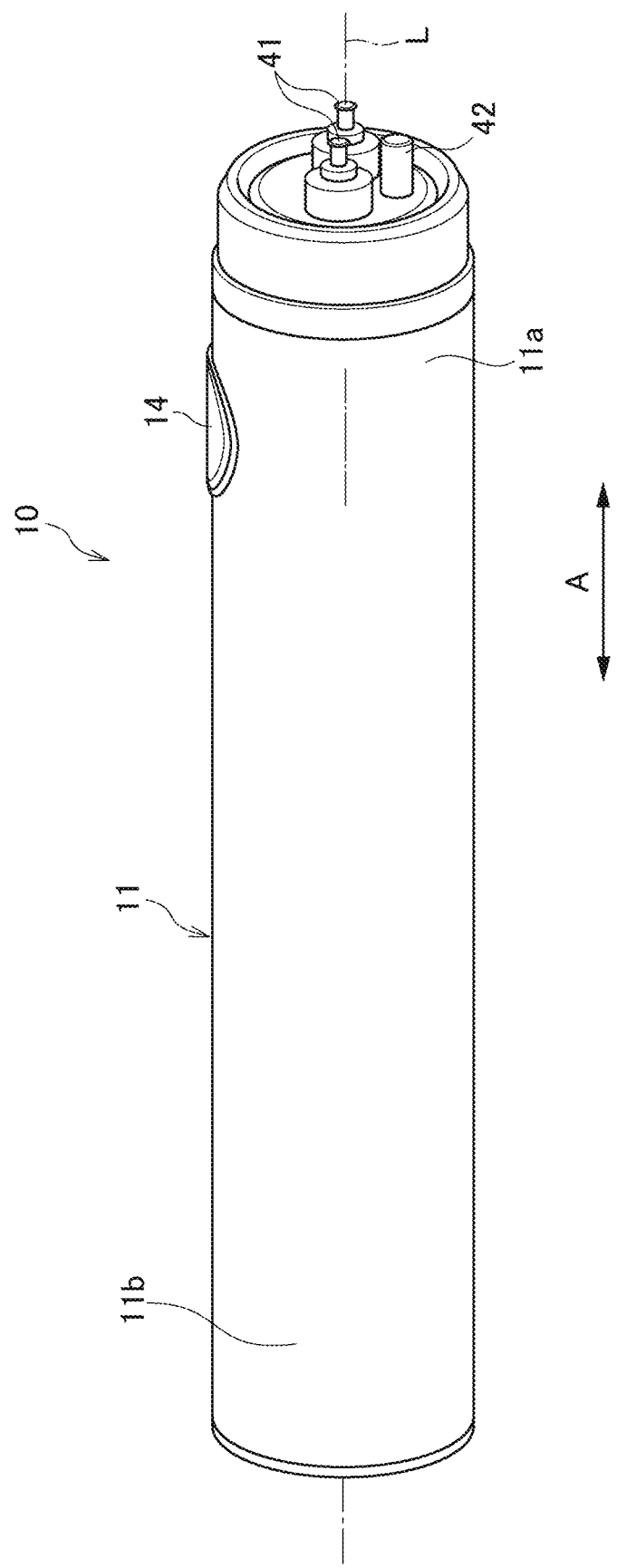
FIG. 2 is a perspective view of the power supply unit of the aerosol inhaler shown in FIG. 1.
Figure 3:
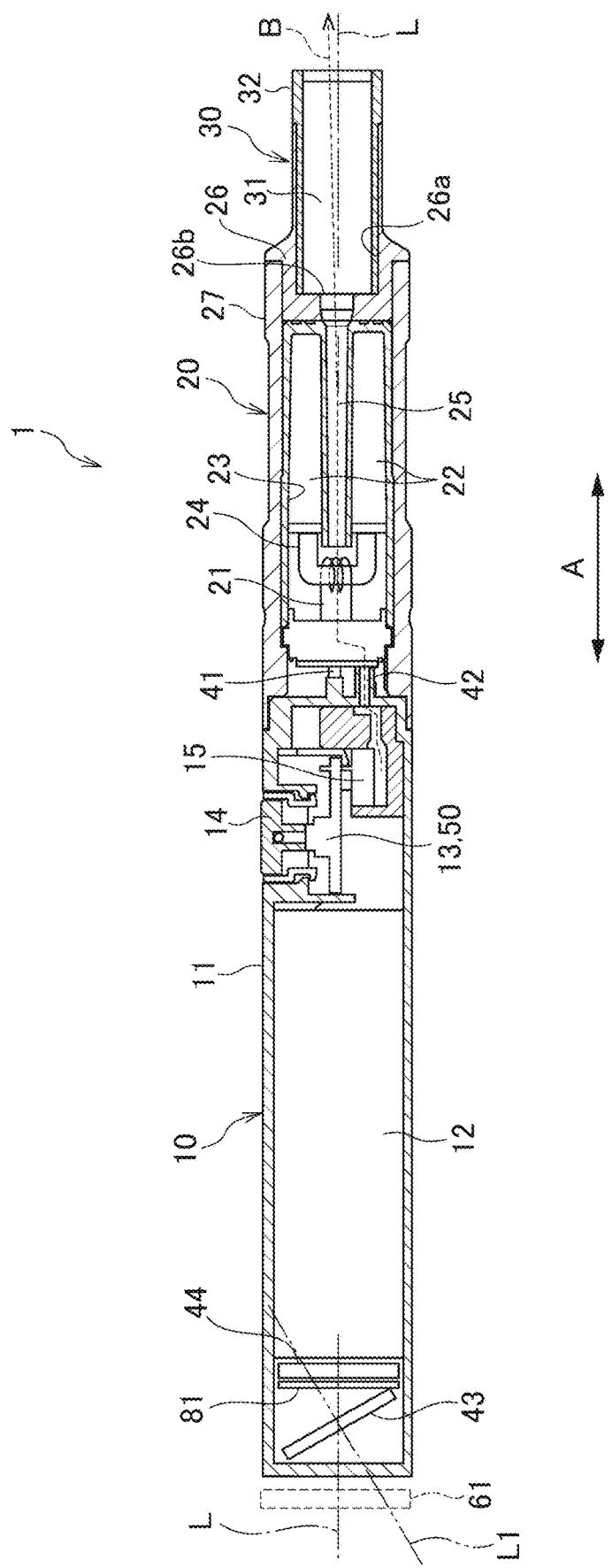
FIG. 3 is a sectional view of the aerosol inhaler shown in FIG. 1.

As shown in FIGS. 2 and 3, the power supply unit 10 according to a first embodiment accommodates a power supply 12, a charger 13, a control unit 50, various sensors and the like inside a cylindrical power supply unit case 11.

Discharge terminals 41 are provided on a top portion 11a located on one end side (a first cartridge 20 side) of the power supply unit case 11 in the longitudinal direction A. The discharge terminals 41 are provided so as to protrude from an upper surface of the top portion 11a toward the first cartridge 20, and are configured to be electrically connectable to a load 21 of the first cartridge 20.

An air supply portion 42 that supplies air to the load 21 of the first cartridge 20 is provided on the upper surface of the top portion 11a in vicinity of the discharge terminals 41. A power reception coil 43 for charging the power supply 12 in a wireless manner with an external power supply (not shown) and a rectifier 44 that converts AC power received by the power reception coil 43 into DC power are accommodated in a bottom portion 11b located on the other end side (a side opposite to the first cartridge 20) of the power supply unit case 11 in the longitudinal direction A. A method of wireless power transfer may be an electromagnetic induction method, a magnetic resonance method, a combination of the electromagnetic induction method and the magnetic resonance method, or other methods. In any method of wireless power transfer, the power supply unit case 11 may or may not be in physical contact with the external power supply. In the present specification, the wireless power transfer is treated as being synonymous with non-contact power transfer.

A user-operable operation unit 14 is provided on a side surface of the top portion 11a of the power supply unit case 11. The operation unit 14 includes a button type switch, a touch panel and the like, and is used when the control unit 50 and various sensors are activated or shut off, which reflects intention of a user.

The power supply 12 is a rechargeable secondary battery, and is preferably a lithium ion secondary battery. The charger 13 controls charging power input from the rectifier 44 to the power supply 12. The charger 13 is configured by using a charging IC including a DC-DC converter, a voltmeter, a ammeter, a processor and the like.

Figure 4:
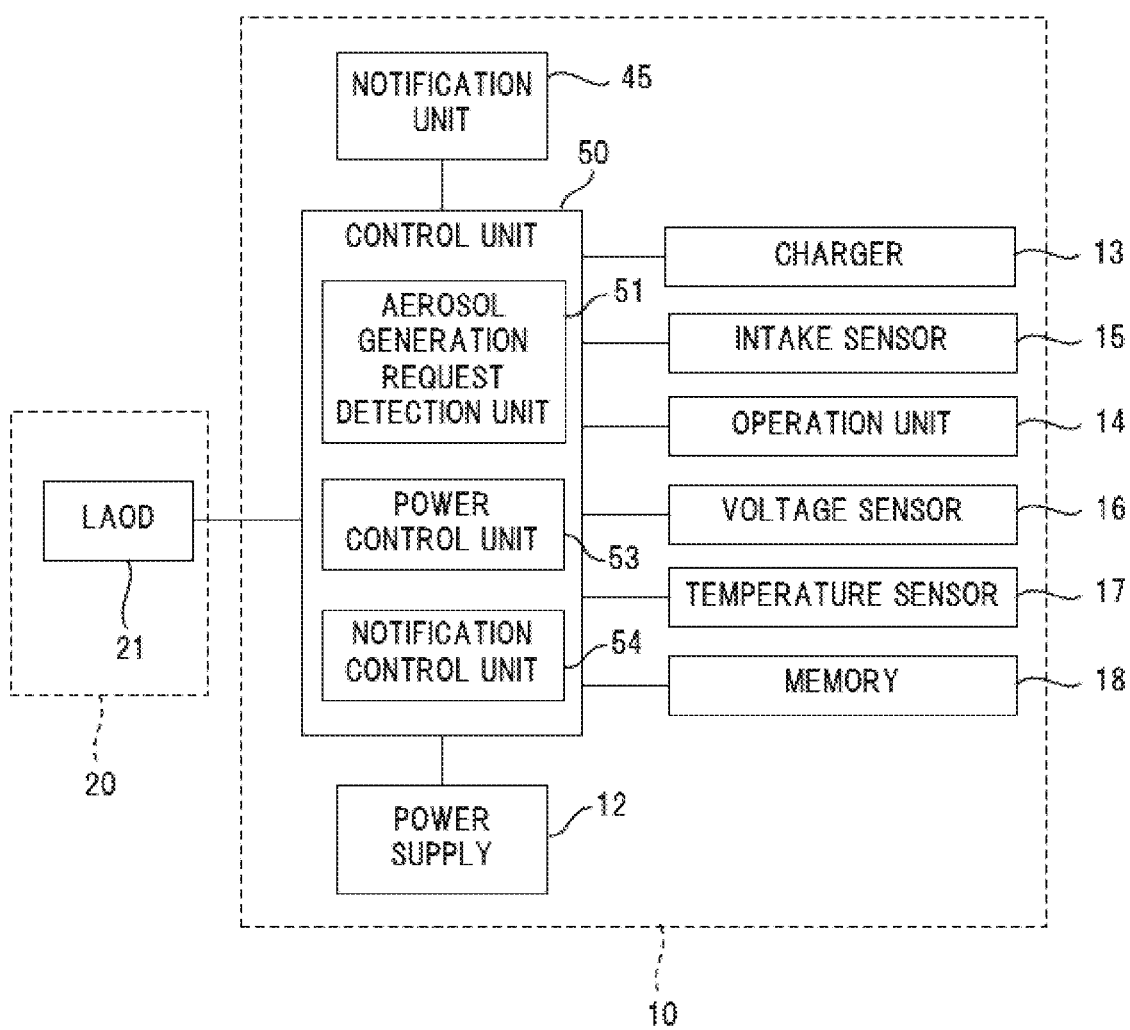
FIG. 4 is a block diagram showing a main part configuration of the power supply unit of the aerosol inhaler shown in FIG. 1.

As shown in FIG. 4, the control unit 50 is connected to the charger 13, the operation unit 14, various sensor devices such as an intake sensor 15 that detects a puff (intake) operation, a voltage sensor 16 that measures a voltage of the power supply 12, a temperature sensor 17 that detects a temperature, and a memory 18 that stores the number of puff operations or time for energizing the load 21. The control unit 50 performs various controls on the aerosol inhaler 1. The intake sensor 15 may be constituted by a condenser microphone, a pressure sensor or the like. Specifically, the control unit 50 is a processor (MCU: micro controller unit). More specifically, a structure of the processor is an electric circuit obtained by combining circuit elements such as semiconductor elements.

(First Cartridge)

As shown in FIG. 3, the first cartridge 20 includes, inside a cylindrical cartridge case 27, a reservoir 23 that stores an aerosol source 22, the electric load 21 that atomizes the aerosol source 22, a wick 24 that draws the aerosol source from the reservoir 23 to the load 21, an aerosol flow path 25 in which aerosol generated by atomization of the aerosol source 22 flows toward the second cartridge 30, and an end cap 26 that accommodates a part of the second cartridge 30.

The reservoir 23 is partitioned and formed so as to surround a periphery of the aerosol flow path 25, and stores the aerosol source 22. A porous body such as a resin web or cotton may be accommodated in the reservoir 23, and the aerosol source 22 may be impregnated in the porous body. The reservoir 23 may only store the aerosol source 22 without accommodating the porous body such as the resin web or the cotton. The aerosol source 22 includes a liquid such as glycerin, propylene glycol or water.

The wick 24 is a liquid holding member that draws the aerosol source 22 from the reservoir 23 to the load 21 by using a capillary phenomenon, and is formed of, for example, glass fiber or porous ceramic.

The load 21 atomizes the aerosol source 22 without combustion with the power supplied from the power supply 12 via the discharge terminals 41. The load 21 is formed of an electric heating wire (coil) wound at a predetermined pitch. The load 21 may be any element capable of generating the aerosol by atomizing the aerosol source 22, and is, for example, a heating element or an ultrasonic generator. Examples of the heating element include a heating resistor, a ceramic heater and an induction heating type heater.

The aerosol flow path 25 is provided on a downstream side of the load 21 and on a center line L of the power supply unit 10.

The end cap 26 includes a cartridge accommodation portion 26a that accommodates a part of the second cartridge 30, and a communication path 26b that allows the aerosol flow path 25 and the cartridge accommodation portion 26a to communicate with each other.

(Second Cartridge)

The second cartridge 30 stores a flavor source 31. The second cartridge 30 is detachably accommodated in the cartridge accommodation portion 26a provided in the end cap 26 of the first cartridge 20. An end portion of the second cartridge 30 on a side opposite to the first cartridge 20 is a suction port 32 for the user. The suction port 32 is not limited to being integrally formed with the second cartridge 30, but may be configured to be attachable to and detachable from the second cartridge 30. By configuring the suction port 32 separately from the power supply unit 10 and the first cartridge 20 in this way, the suction port 32 can be kept hygienic.

The second cartridge 30 imparts the flavor to the aerosol by passing the aerosol generated by atomizing the aerosol source 22 by the load 21 through the flavor source 31. As a raw material piece constituting the flavor source 31, chopped tobacco or a molded product obtained by molding a tobacco raw material into particles can be used. The flavor source 31 may be formed of a plant other than tobacco (for example, mint, Chinese herb or herb). The flavor source 31 may be provided with a fragrance such as menthol.

In the aerosol inhaler 1 according to the present embodiment, the aerosol to which the flavor is added can be generated by the aerosol source 22, the flavor source 31 and the load 21. That is, the aerosol source 22 and the flavor source 31 can be referred to as an aerosol generation source that generates the aerosol.

In addition to a configuration in which the aerosol source 22 and the flavor source 31 are separated from each other, a configuration in which the aerosol source 22 and the flavor source 31 are integrally formed, a configuration in which the flavor source 31 is omitted and substances that may be included in the flavor source 31 are added to the aerosol source 22, or a configuration in which a drug, a Chinese herb or the like instead of the flavor source 31 is added to the aerosol source 22 may also be employed as the configuration of the aerosol generation source used in the aerosol inhaler 1.

In the aerosol inhaler 1 configured as described above, as shown by an arrow B in FIG. 3, the air flowing in from an air intake port (not shown) provided in the power supply unit case 11 passes through vicinity of the load 21 of the first cartridge 20 from the air supply portion 42. The load 21 atomizes the aerosol source 22 drawn or moved from the reservoir 23 by the wick 24. The aerosol generated by atomization flows through the aerosol flow path 25 together with the air flowing in from the air intake port, and is supplied to the second cartridge 30 via the communication path 26b. The aerosol supplied to the second cartridge 30 is imparted the flavor by passing through the flavor source 31, and is supplied to the suction port 32.

The aerosol inhaler 1 is provided with a notification unit 45 that notifies various types of information. The notification unit 45 may be constituted by a light emitting element, a vibration element or a sound output element. The notification unit 45 may also be a combination of two or more elements among the light emitting element, the vibration element and the sound output element. The notification unit 45 may be provided in any of the power supply unit 10, the first cartridge 20 and the second cartridge 30, but is preferably provided in the power supply unit 10 in order to shorten a conductive wire from the power supply 12. For example, a periphery of the operation unit 14 is translucent, and is configured to emit light by a light emitting element such as an LED.

(Electric Circuit)

Next, an electric circuit of the power supply unit 10 will be described with reference to FIG. 5.

The power supply unit 10 includes the power supply 12, a positive electrode side discharge terminal 41a and a negative electrode side discharge terminal 41b constituting the discharge terminals 41, the control unit 50 connected between a positive electrode side of the power supply 12 and the positive electrode side discharge terminal 41a and between a negative electrode side of the power supply 12 and the negative electrode side discharge terminal 41b, a wireless charging circuit 46 including the power reception coil 43 and the rectifier 44, the charger 13 arranged on a power transmission path between the wireless charging circuit 46 and the power supply 12, and a switch 19 arranged on the power transmission path between the power supply 12 and the discharge terminals 41. The switch 19 is formed of, for example, a MOSFET, and is controlled to be opened and closed by the control unit 50 adjusting a gate voltage.

(Control Unit)

As shown in FIG. 4, the control unit 50 includes an aerosol generation request detection unit 51, a power control unit 53 and a notification control unit 54.

The aerosol generation request detection unit 51 detects an aerosol generation request based on an output result of the intake sensor 15. The intake sensor 15 is configured to output a value of a change in pressure in the power supply unit 10 caused by suction of the user through the suction port 32. The intake sensor 15 is, for example, a pressure sensor that outputs an output value (for example, a voltage value or a current value) corresponding to an air pressure that changes due to a flow rate of the air sucked from the air intake port toward the suction port 32 (that is, the puff operation of the user). The intake sensor may be configured to determine whether the detected flow rate or pressure of the air can correspond to the puff operation of the user and output one of an ON value and an OFF value.

The notification control unit 54 controls the notification unit 45 to notify various types of information. For example, the notification control unit 54 controls the notification unit 45 to notify a replacement timing of the second cartridge 30 according to detection of the replacement timing of the second cartridge 30. The notification control unit 54 notifies the replacement timing of the second cartridge 30 based on the number of the puff operations or the cumulative time for energizing the load 21 stored in the memory 18. The notification control unit 54 may notify not only the replacement timing of the second cartridge 30, but also a replacement timing of the first cartridge 20, a replacement timing of the power supply 12, a charging timing of the power supply 12 and the like.

When the aerosol generation request detection unit 51 detects the aerosol generation request, the power control unit 53 controls discharge of the power supply 12 via the discharge terminals 41 by turning on or turning off the switch 19.

The power control unit 53 performs control such that an amount of the aerosol generated by atomizing the aerosol source by the load 21 falls within a desired range, in other words, an amount of the power supplied from the power supply 12 to the load 21 falls within a certain range. Specifically, the power control unit 53 controls on/off of the switch 19 by, for example, pulse width modulation (PWM) control. Instead of this, the power control unit 53 may control the on/off of the switch 19 by pulse frequency modulation (PFM) control.

The power control unit 53 may stop power supply from the power supply 12 to the load 21 when a predetermined period has elapsed since the power supply to the load 21 is started. In other words, the power control unit 53 stops the power supply from the power supply 12 to the load 21 when a puff period exceeds the predetermined period even within the puff period when the user actually performs the puff operation. The predetermined period is set in order to reduce variations in the puff period of the user. The power control unit 53 controls a duty ratio of the on/off of the switch 19 during one puff operation according to an amount of electricity stored in the power supply 12. For example, the power control unit 53 controls an on-time interval (a pulse interval) for supplying power from the power supply 12 to the load 21, and controls an on-time length (a pulse width) for supplying power from the power supply 12 to the load 21.

The power control unit 53 detects power reception from the external power supply by the power reception coil 43, and controls charging of the power supply 12 via the charger 13.

(Wireless Charging Circuit)

Figure 5:
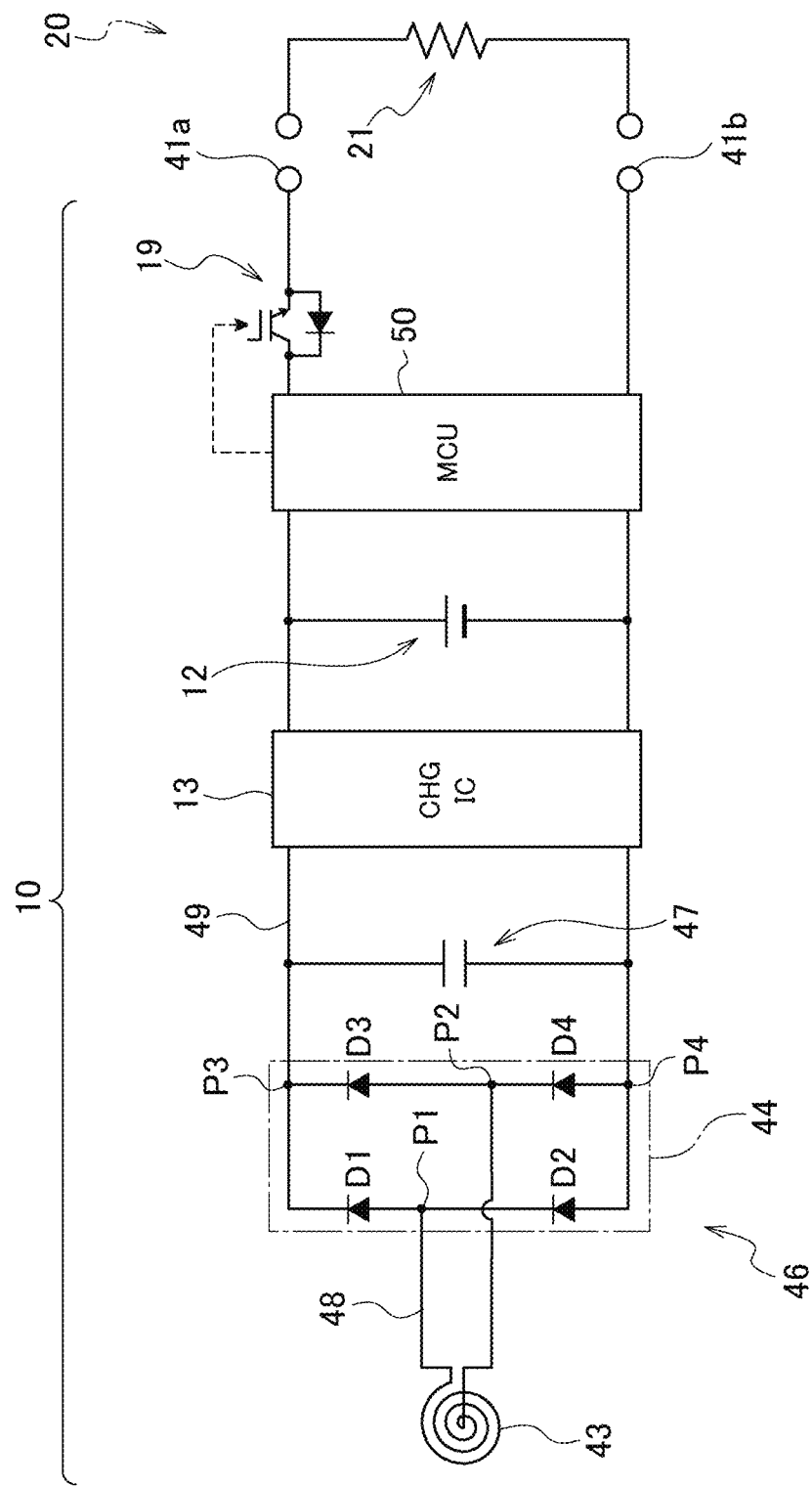
FIG. 5 is a schematic diagram showing a circuit configuration of the power supply unit of the aerosol inhaler shown in FIG. 1.

As shown in FIG. 5, the wireless charging circuit 46 includes the power reception coil 43, the rectifier 44, a smoothing capacitor 47, an AC conductive wire 48 and a DC conductive wire 49.

Figure 6A:
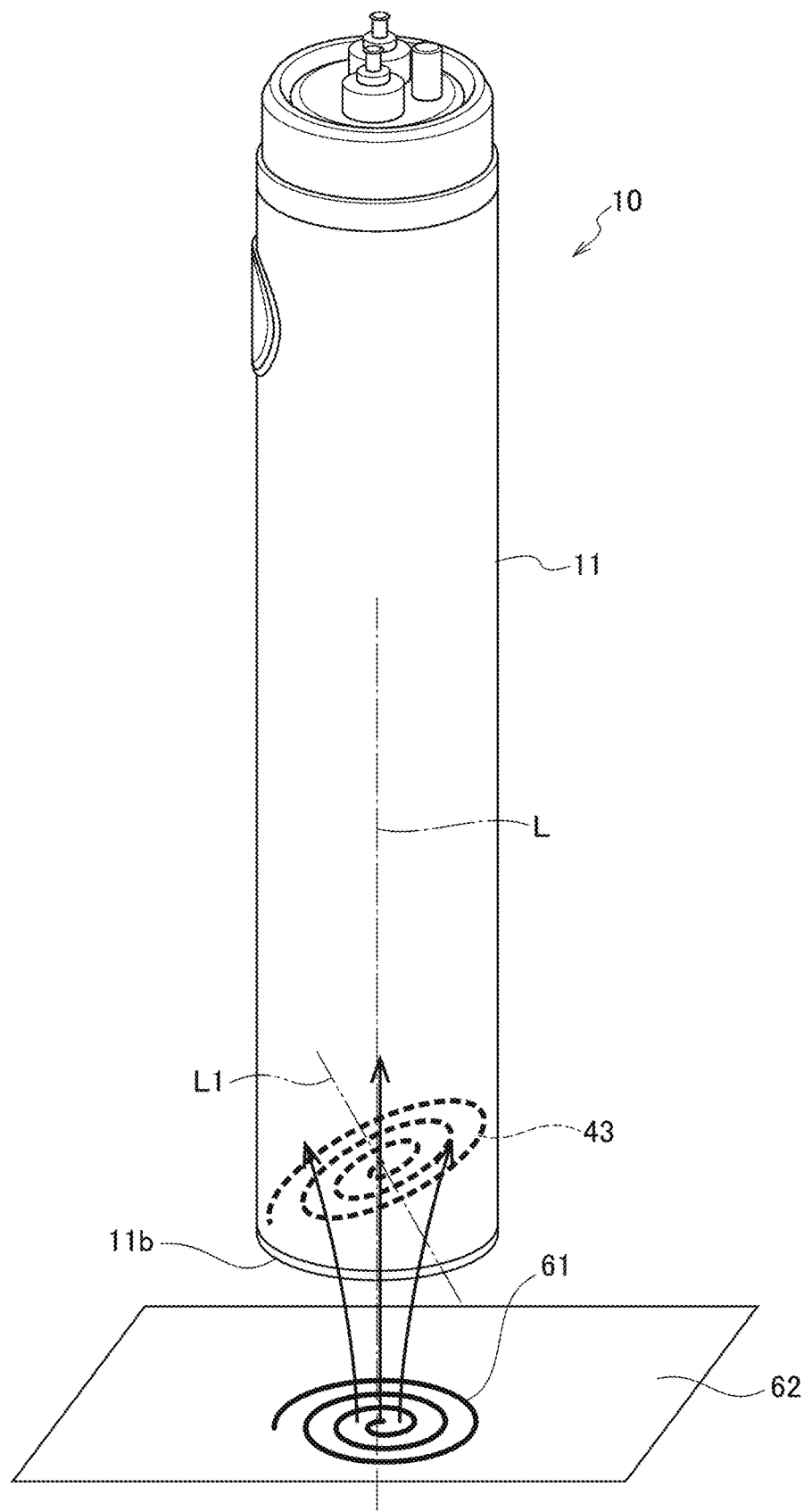
FIG. 6A is a perspective view schematically showing a state of wireless charging during vertical placement of the power supply unit of the aerosol inhaler shown in FIG. 1.
Figure 6B:
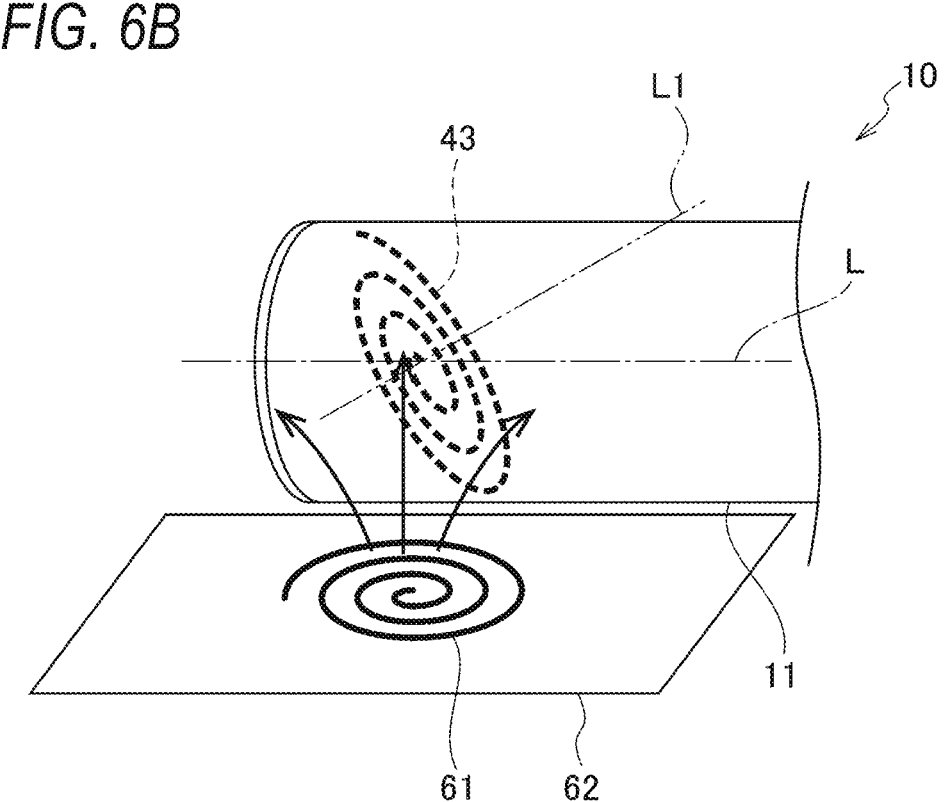
FIG. 6B is a perspective view schematically showing a state of wireless charging during horizontal placement of the power supply unit of the aerosol inhaler shown in FIG. 1.

During charging, the power reception coil 43 is arranged close to a power transmission coil 61 that is excited by the AC power from the external power supply in the wireless manner, and receives the AC power from the power transmission coil 61 in the wireless manner. As shown in FIGS. 6A and 6B, although the power reception coil 43 according to the present embodiment is constituted by one coil, the power reception coil 43 is arranged on the bottom portion 11b of the power supply unit case 11 so as to be capable of receiving the power in the wireless manner in both a case where the power supply unit case 11 is placed vertically (see FIG. 6A) and a case where the power supply unit case 11 is placed horizontally (see FIG. 6B).

More specifically with reference to FIG. 3, the power reception coil 43 according to the present embodiment is arranged such that a coil winding axis center line L1 is oblique (for example, 45°) with respect to a center line L of the power supply unit case 11 in a length direction. As shown in FIG. 6A, when the power supply unit 10 is placed vertically, with the bottom portion 11b of the power supply unit case 11 facing downward, on the charging mat 62 in which the power transmission coil 61 is installed, the power reception coil 43 faces the power transmission coil 61 of a charging mat 62 at a predetermined angle (for example, 45°) in the wireless manner, and magnetic flux from the power transmission coil 61 penetrates the power reception coil 43. As shown in FIG. 6B, when the power supply unit 10 is placed horizontally on the charging mat 62, the power reception coil 43 faces the power transmission coil 61 of the charging mat 62 at a predetermined angle (for example, 45°) in the wireless manner, and the magnetic flux from the power transmission coil 61 penetrates the power reception coil 43.

In wireless charging of the electromagnetic induction method, as the magnetic flux generated by the power transmission coil 61 penetrating the power reception coil 43 increases, efficiency of the wireless charging is improved. In other words, when the magnetic flux generated by the power transmission coil 61 penetrating the power reception coil 43 is 0, the wireless charging cannot be performed. In order for the magnetic flux generated by the power transmission coil 61 to penetrate the power reception coil 43, the power reception coil 43 and the power transmission coil 61 need to face each other. It should be noted that, in the present specification, when the angle formed by the power reception coil 43 and the power transmission coil 61 is 90°, the power reception coil 43 and the power transmission coil 61 are not regarded as facing each other.

As described above, in the present embodiment, regardless of whether the power supply unit 10 is placed vertically on the charging mat 62 or the power supply unit 10 is placed horizontally on the charging mat 62, the power reception coil 43 faces the power transmission coil 61 at the predetermined angle (for example, 45°) in the wireless manner, and the magnetic flux from the power transmission coil 61 penetrates the power reception coil 43. Therefore, in either case, the power can be received by the power reception coil.

Although the wireless charging of the electromagnetic induction method has been described above, even in wireless charging of the magnetic resonance method, when the angle formed by the power reception coil 43 and the power transmission coil 61 is 90°, the wireless charging cannot be performed since the power transmission coil 61 does not resonate due to a magnetic field generated by the power reception coil 43. Therefore, the power reception coil 43 is arranged such that the coil winding axis center line L1 is oblique (for example, 45°) with respect to the center line L of the power supply unit case 11 in the length direction. In this way, even in the wireless charging of the magnetic resonance method, regardless of whether the power supply unit 10 is placed vertically on the charging mat 62 or the power supply unit 10 is placed horizontally on the charging mat 62, the power can be received by the power reception coil.

The angle of the coil winding axis center line L1 with respect to the center line L of the power supply unit case 11 is not limited to 45°, and is appropriately selected based on, for example, a frequency when the power supply unit 10 is placed vertically and horizontally, a distance between the power transmission coil 61 and the power reception coil 43 when the power supply unit 10 is placed vertically and horizontally.

The power supply unit case 11 is preferably provided with a position regulation portion such that the power supply unit 10 can be maintained within a predetermined angular range in which the power can be received when the power supply unit 10 is placed horizontally.

According to such a power supply unit 10, since the user does not need to care about an orientation of the power supply unit case 11 when the power supply 12 is charged in the wireless manner, convenience in charging the power supply 12 in the wireless manner can be improved. Since the power reception coil 43 is arranged obliquely with respect to the center line L of the power supply unit case 11 in the length direction, the wireless charging can be performed by one power reception coil 43 in both vertical placement and horizontal placement.

The rectifier 44 converts the AC power received by the power reception coil 43 into the DC power. The DC power converted by the rectifier 44 is smoothed by the smoothing capacitor 47. As shown in FIG. 5, the rectifier 44 according to the present embodiment is a full-wave rectifier circuit in which four diodes D1 to D4 are bridge-connected, and may be a half-wave rectifier circuit. To describe the rectifier 44 according to the present embodiment more specifically, an anode of the diode D1 and a cathode of the diode D2 are connected to the AC conductive wire 48 extending from one end of the power reception coil 43 at a first connection point P1, and an anode of the diode D3 and a cathode of the diode D4 are connected to the AC conductive wire 48 extending from the other end of the power reception coil 43 at a second connection point P2. Cathodes of the diodes D1 and D3 are connected to the positive electrode side DC conductive wire 49 at a third connection point P3, and anodes of the diodes D2 and D4 are connected to the negative electrode side DC conductive wire 49 at a fourth connection point P4.

The AC conductive wire 48 connects the power reception coil 43 and the rectifier 44, and supplies the AC power received by the power reception coil 43 to the rectifier 44. Since the AC power flows through the AC conductive wire 48, heat may be generated due to a skin effect.

The DC conductive wire 49 connects the rectifier 44 and the charger 13, and supplies the DC power converted by the rectifier 44 to the charger 13. Unlike the AC conductive wire 48, the DC conductive wire 49 does not generate heat due to the skin effect.

Here, a length of the DC conductive wire 49 is preferably equal to or larger than that of the AC conductive wire 48. In this way, since the AC conductive wire 48 can be shortened, heat generation in the AC conductive wire 48 due to the skin effect and influence of the heat generation in the AC conductive wire 48 on circuit elements can be prevented. In particular, when the magnetic resonance method is used, a temperature of the power reception coil 43 is increased due to the heat generation in the AC conductive wire 48, so that a coupling coefficient between the power transmission coil 61 and the power reception coil 43 is reduced, and power transmission efficiency is reduced. By shortening the AC conductive wire 48, a decrease in the power transmission efficiency can be prevented. The circuit elements include, in addition to the rectifier 44, the charger 13 and circuit elements included in the control unit 50, capacitors and resistors provided on a board (not shown) on which these are mounted.

(Arrangement Configuration)

As shown in FIG. 3, inside the power supply unit case 11, the power reception coil 43 and the rectifier 44 are arranged in the bottom portion 11b, and the charger 13 is arranged on a side opposite to the power reception coil 43 and the rectifier 44 with respect to the power supply 12. During charging in a state where the power supply unit case 11 is placed vertically, the power reception coil 43 is arranged below the power supply 12 in the vertical direction, so that the distance between the power reception coil 43 and the power transmission coil 61 of the charging mat 62 is shortened, and the power transmission efficiency is improved. Further, since the charger 13 is arranged on the side opposite to the power reception coil 43 with the power supply 12 interposed therebetween, influence of a leakage magnetic field of the power reception coil 43 on the charger 13 can be prevented.

A center of the power reception coil 43 may be a cavity, and components of the power supply unit 10 such as the power supply 12 may be arranged in the cavity, or may be arranged so as to penetrate the cavity. By configuring the power supply unit 10 in this way, a size of the power supply unit 10 can be reduced.

The power reception coil 43 and the rectifier 44 are preferably arranged on one of one end side and the other end side of the power supply 12 in the longitudinal direction A. Thereby, since the AC conductive wire 48 connecting the power reception coil 43 and the rectifier 44 does not need to cross or traverse the power supply 12 that is the largest among components of the aerosol inhaler 1, the AC conductive wire 48 is shortened and the skin effect is reduced. The power reception coil 43 and the rectifier 44 may be arranged on either one of one end side and the other end side of the power supply 12 in a direction orthogonal to the longitudinal direction A. Although the elongated cylindrical power supply unit 10 is illustrated in the present embodiment, the power supply unit case 11 of the power supply unit 10 may be a rectangular columnar body having rectangular upper and lower surfaces, or an elliptical columnar body having elliptical upper and lower surfaces, or may have an oval shape as a whole. In this case, if the charger 13 is arranged on the side opposite to the power reception coil 43 with the power supply 12 interposed therebetween in the direction orthogonal to the longitudinal direction A, the influence of the leakage magnetic field of the power reception coil 43 on the charger 13 can be prevented more appropriately.

As shown in FIG. 3, a shield 81 that protects the circuit elements from the leakage magnetic field of the power reception coil 43 is provided in the power supply unit case 11 that accommodates the power reception coil 43. The shield 81 is formed of ferrite, a soft magnetic material or the like, and can shield or reduce the leakage magnetic field by absorbing leakage magnetic flux.

(Modification of Circuit Configuration)

Figure 7:
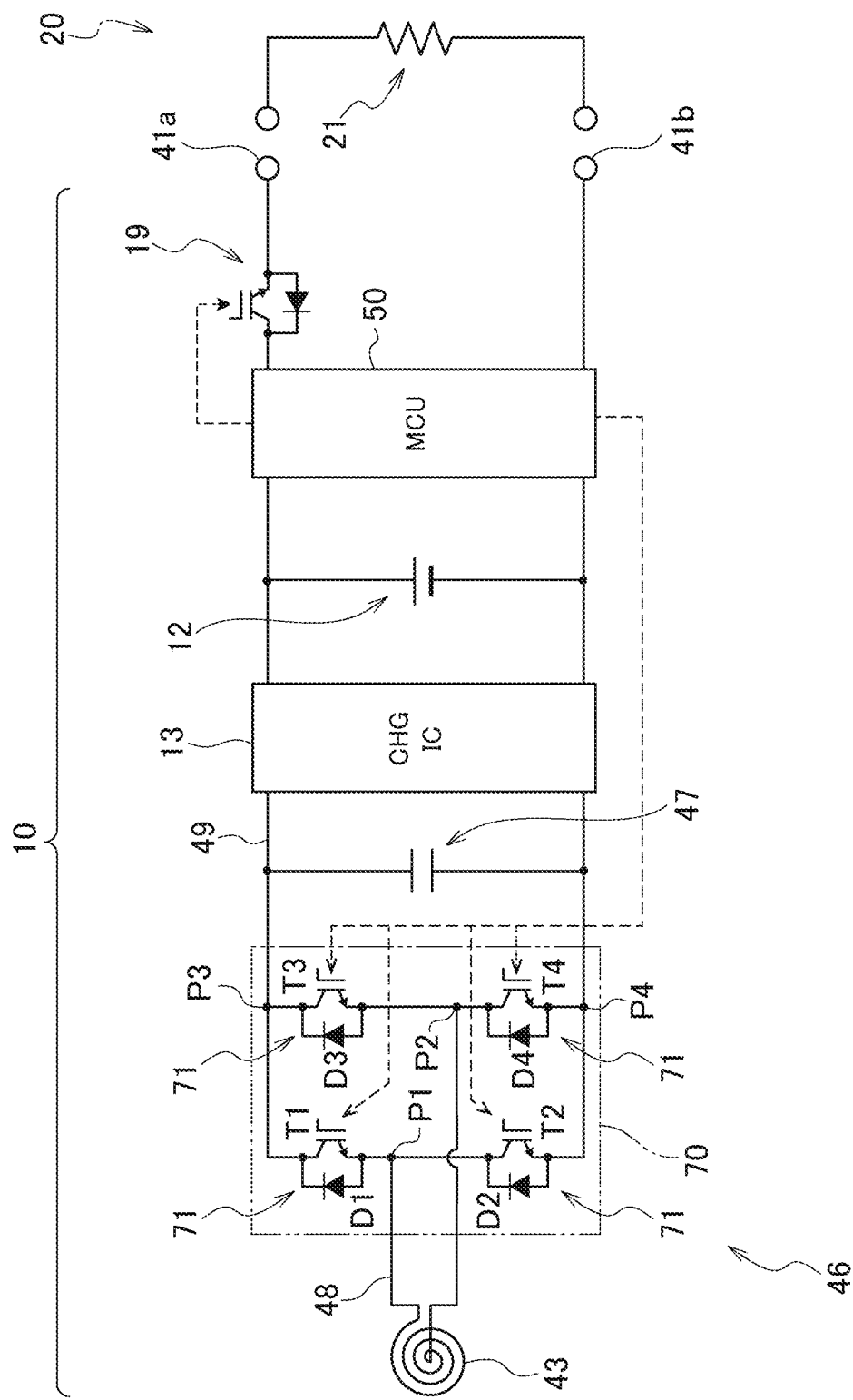
FIG. 7 is a schematic diagram showing a modification of the circuit configuration of the power supply unit of the aerosol inhaler shown in FIG. 1.

A circuit configuration applied to the power supply unit 10 according to the present embodiment is not limited to a circuit configuration shown in FIG. 5, and, for example, a circuit configuration shown in FIG. 7 can be applied. The circuit configuration shown in FIG. 7 is different from the circuit configuration shown in FIG. 5 in that an inverter 70 is provided as a converter instead of the rectifier 44. The inverter 70 is formed by bridge-connecting four switching elements 71. The switching element 71 is, for example, a transistor such as an insulated gate bipolar transistor (IGBT) or a metal oxide semi-conductor field effect transistor (MOSFET), and opening and closing control is performed by the control unit 50 adjusting a gate voltage.

To describe the inverter 70 according to the present embodiment more specifically, an emitter of a transistor T1 and a collector of a transistor T2 are connected to the AC conductive wire 48 extending from one end of the power reception coil 43 at the first connection point P1, and an emitter of a transistor T3 and a collector of a transistor T4 are connected to the AC conductive wire 48 extending from the other end of the power reception coil 43 at the second connection point P2. Collectors of the transistor T1 and the transistor T3 are connected to the positive electrode side DC conductive wire 49 at the third connection point P3, and emitters of the transistor T2 and the transistor T4 are connected to the negative electrode side DC conductive wire 49 at the fourth connection point P4. Each of the diodes D1 to D4 connected in a forward direction from the emitter to the collector is provided between the collector and the emitter of each of transistors T1 to T4. Since the inverter 70 is used instead of the rectifier 44, the power reception coil 43 can be used as a power transmission coil.

That is, the power reception coil 43 can be excited by power of the power supply 12 while a power reception coil of the other device is brought close to the power reception coil 43, and the power can be transmitted to the power reception coil of the other device. At this time, the inverter 70 converts DC power supplied from the power supply 12 into AC power by repeating a state where the transistors T1, T4 are turned on and the transistors T2, T3 are turned off and a state where the transistors T1, T4 are turned off and the transistors T2, T3 are turned on. When the inverter 70 converts the AC power received by the power reception coil 43 into the DC power, all the transistors T1 to T4 are controlled to be turned off.

Next, second and third embodiments of the power supply unit 10 will be sequentially described with reference to FIGS. 8 to 16. Note that description of the first embodiment is incorporated by denoting the same configurations as those of the first embodiment with the same reference numerals as in the first embodiment. Although an inverter may be used instead of a rectifier in the second and third embodiments, the rectifier will be described as an example in the following description. In a circuit configuration applied to the power supply unit 10 according to the second and third embodiments, a circuit between the power supply 12 and the discharge terminals 41 is not shown.

Second Embodiment

Figure 8:
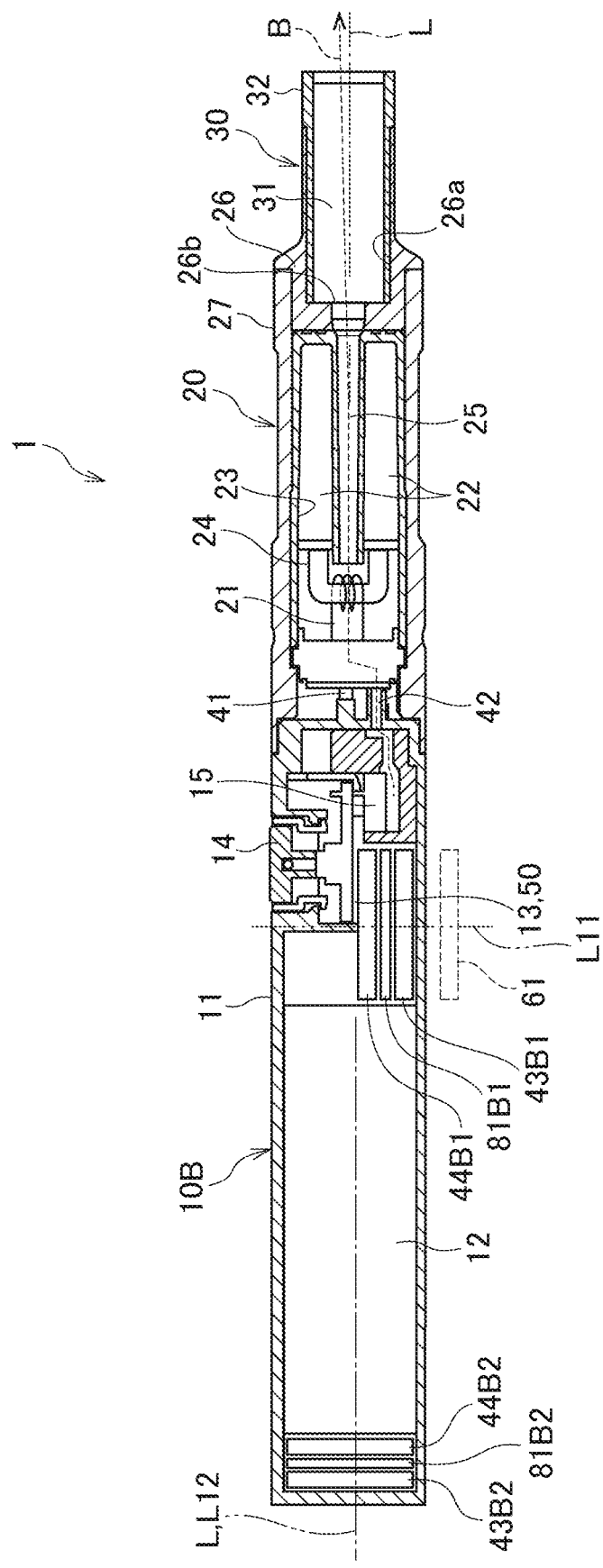
FIG. 8 is a sectional view of an aerosol inhaler according to a second embodiment of the present invention.
Figure 9A:
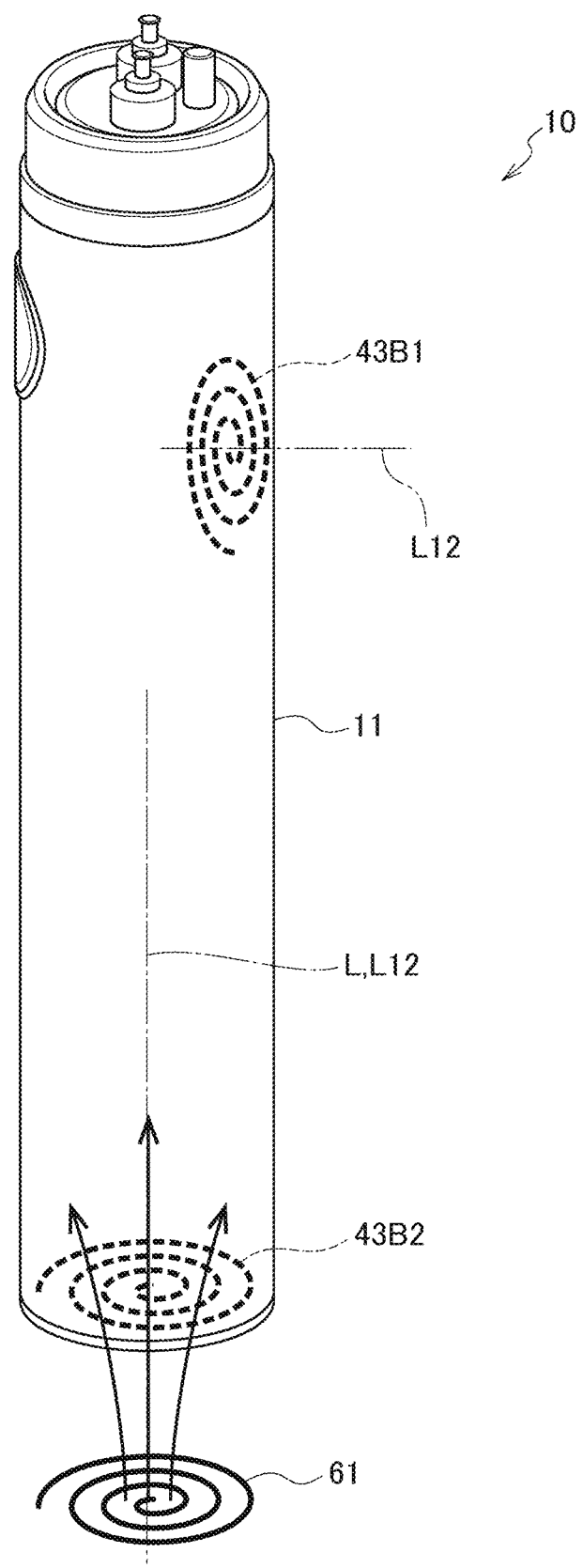
FIG. 9A is a perspective view schematically showing a state of wireless charging during vertical placement of a power supply unit of the aerosol inhaler shown in FIG. 8.
Figure 9B:
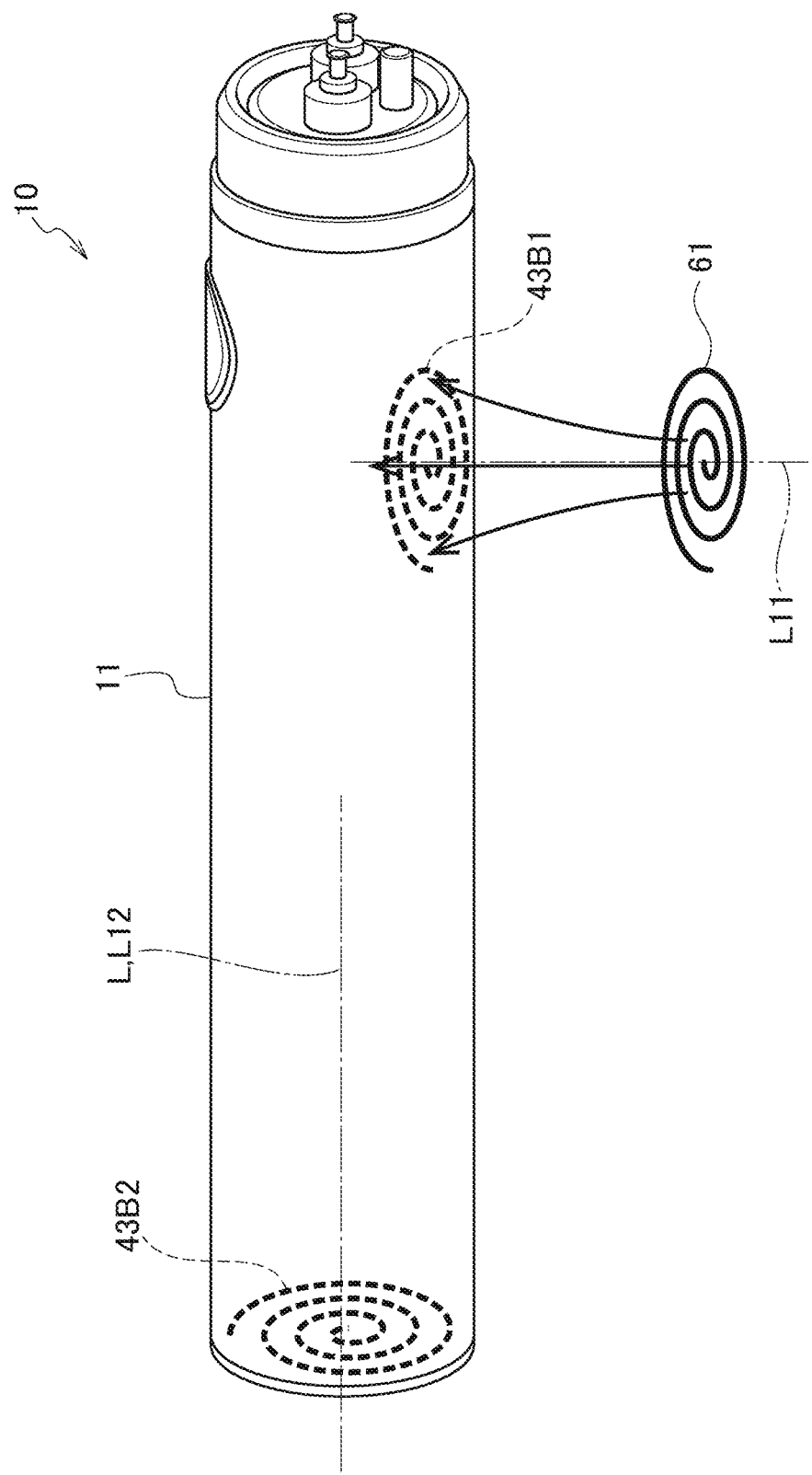
FIG. 9B is a perspective view schematically showing a state of wireless charging during horizontal placement of the power supply unit of the aerosol inhaler shown in FIG. 8.
Figure 10:
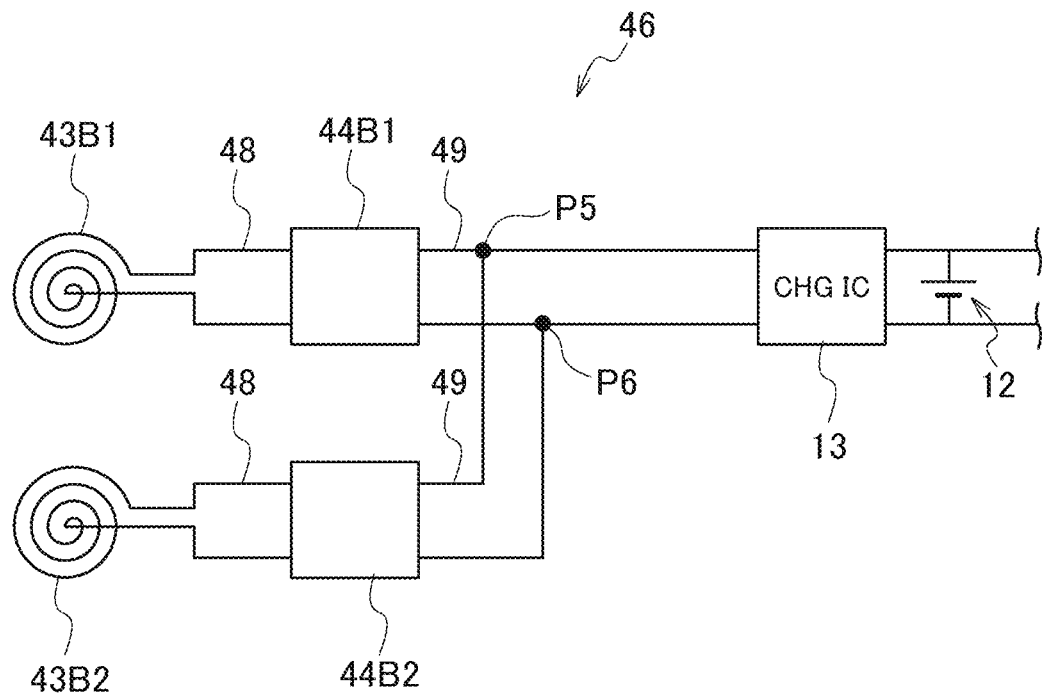
FIG. 10 is a schematic diagram showing a part of a circuit configuration of the power supply unit of the aerosol inhaler shown in FIG. 8.

As shown in FIGS. 8 to 10, the power supply unit 10 according to the second embodiment is different from that according to the first embodiment in that a first power reception coil 43B1 capable of receiving power in a wireless manner when the power supply unit case 11 is placed horizontally (see FIG. 9B) and a second power reception coil 43B2 capable of receiving power in a wireless manner when the power supply unit case 11 is placed vertically (see FIG. 9A) are provided. According to such a power supply unit 10, since power reception coil 43B1, 43B2 respectively dedicated to horizontal placement and vertical placement are provided, charging can be performed efficiently in both horizontal placement and vertical placement.

More specifically, as shown in FIG. 8, the first power reception coil 43B1 is arranged in a substantially intermediate portion (hereinafter simply referred to as an intermediate portion) of the power supply unit case 11 such that a coil winding axis center line L11 extends in a direction orthogonal to the center line L of the power supply unit case 11 in a length direction, and the second power reception coil 43B2 is arranged in the bottom portion 11b of the power supply unit case 11 such that a coil winding axis center line L12 extends along the center line L of the power supply unit case 11 in the length direction. In this way, since the power reception coils 43B1, 43B2 can face the power transmission coil 61 substantially in parallel regardless of whether the charging is performed in a horizontal placement posture or in a vertical placement posture, efficient wireless charging can be performed in both horizontal placement and vertical placement.

As shown in FIG. 10, the first power reception coil 43B1 and the second power reception coil 43B2 are connected in parallel to the charger 13. More specifically, the DC conductive wire 49 connecting the first power reception coil 43B1 and the charger 13 and the DC conductive wire 49 connecting the second power reception coil 43B2 and the charger 13 are connected by a fifth connection point P5 and a sixth connection point P6. In this way, since the charger 13 can be made common, the power supply unit 10 can be prevented from increasing in size, weight and cost. A first rectifier 44B1 is provided between the first power reception coil 43B1 and the charger 13, and a second rectifier 44B2 is provided between the second power reception coil 43B2 and the charger 13. Also in such a circuit configuration, the first power reception coil 43B1 and the second power reception coil 43B2 are connected in parallel to the charger 13 via the first rectifier 44B1 and the second rectifier 44B2 respectively.

When the first power reception coil 43B1 and the second power reception coil 43B2 are connected in parallel to the charger 13, a part of a circuit that connects the first power reception coil 43B1 and the charger 13 and a part of a circuit that connects the second power reception coil 43B2 and the charger 13 can be made common. That is, in the present embodiment, the DC conductive wire 49 between the fifth connection point P5 and the charger 13 and between the sixth connection point P6 and the charger 13 is made common. In this way, the power supply unit 10 can be further prevented from increasing in size, weight and cost by making the circuit common.

As described above, the power supply unit 10 according to the second embodiment includes the first rectifier 44B1 that converts AC power received by the first power reception coil 43B1 into DC power, and the second rectifier 44B2 that converts AC power received by the second power reception coil 43B2 into DC power. In the power supply unit 10 according to the second embodiment, the first power reception coil 43B1 and the second power reception coil 43B2 are arranged apart from each other in the power supply unit case 11, and the first rectifier 44B1 is arranged in vicinity of the first power reception coil 43B1 and the second rectifier 44B2 is arranged in vicinity of the second power reception coil 43B2. In this way, since the AC conductive wire 48 is shortened, heat generation that may be caused by a skin effect and influence thereof on circuit elements can be prevented. Since the first power reception coil 43B1 and the first rectifier 44B1, and the second power reception coil 43B2 and the second rectifier 44B2 are arranged on opposite sides with the power supply 12 interposed therebetween, the power reception coils 43B1, 43B2 can be arranged at optimum positions in vertical placement and horizontal placement without interfering with each other.

(Modification of Circuit Configuration)

Figure 11:
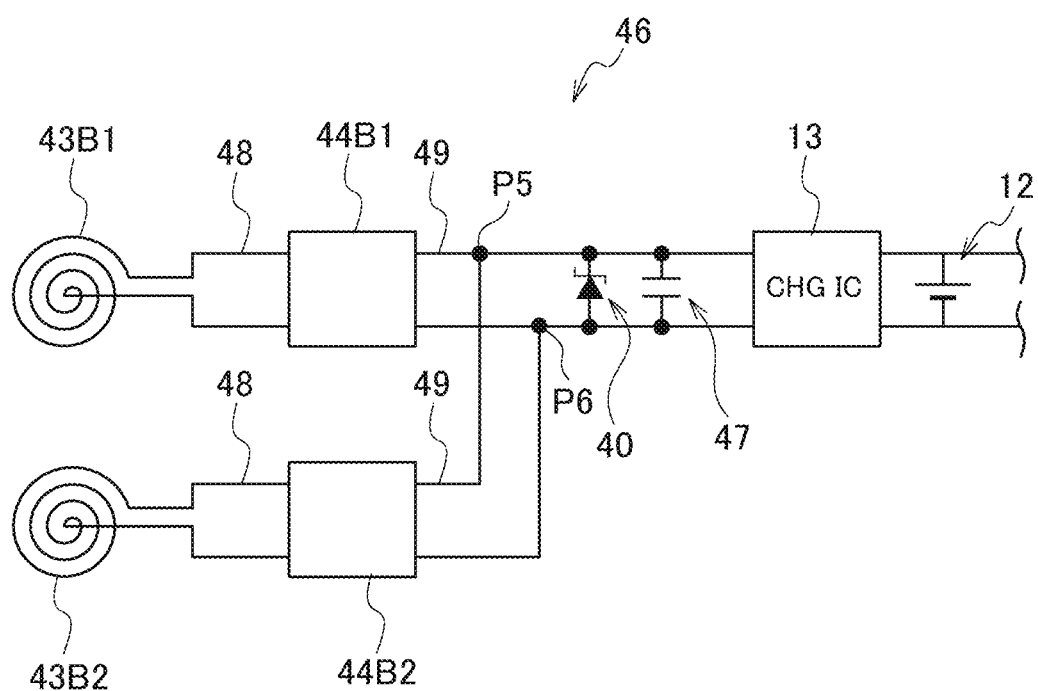
FIG. 11 is a schematic diagram showing a modification of the part of the circuit configuration of the power supply unit of the aerosol inhaler shown in FIG. 8.
Figure 12:
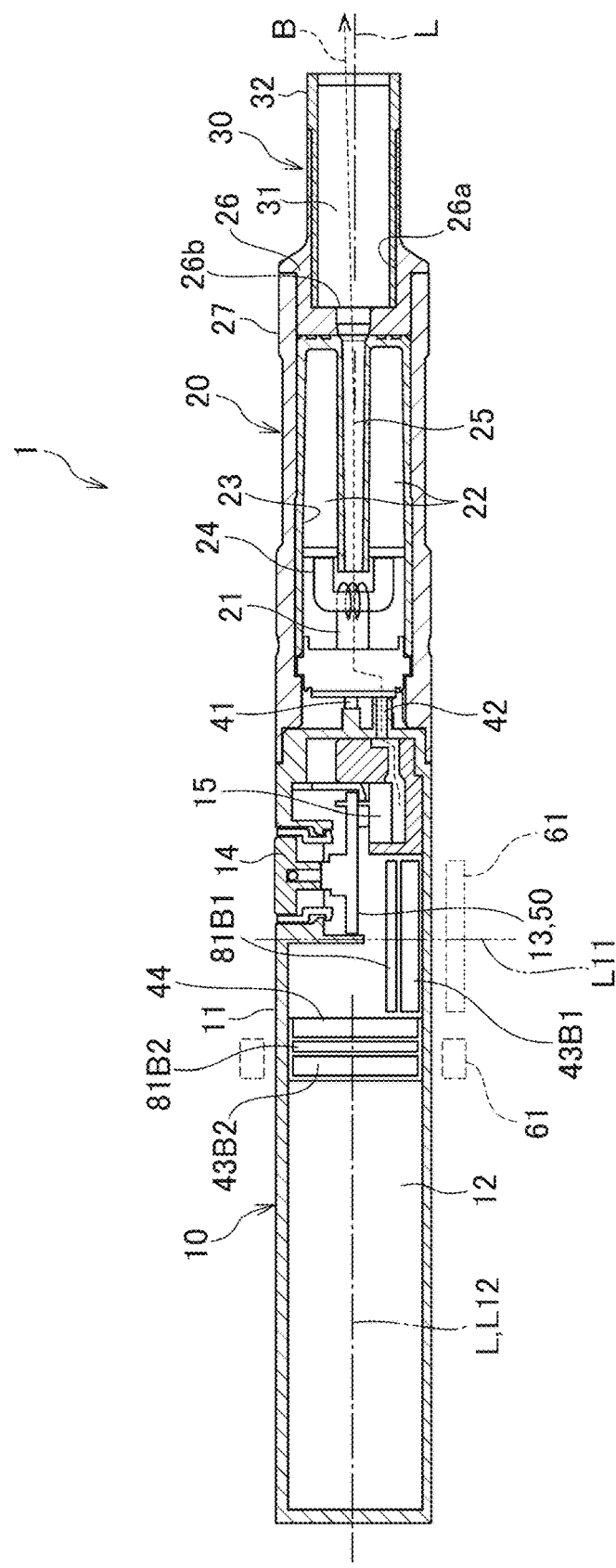
FIG. 12 is a sectional view of an aerosol inhaler according to a third embodiment of the present invention.
Figure 13A:
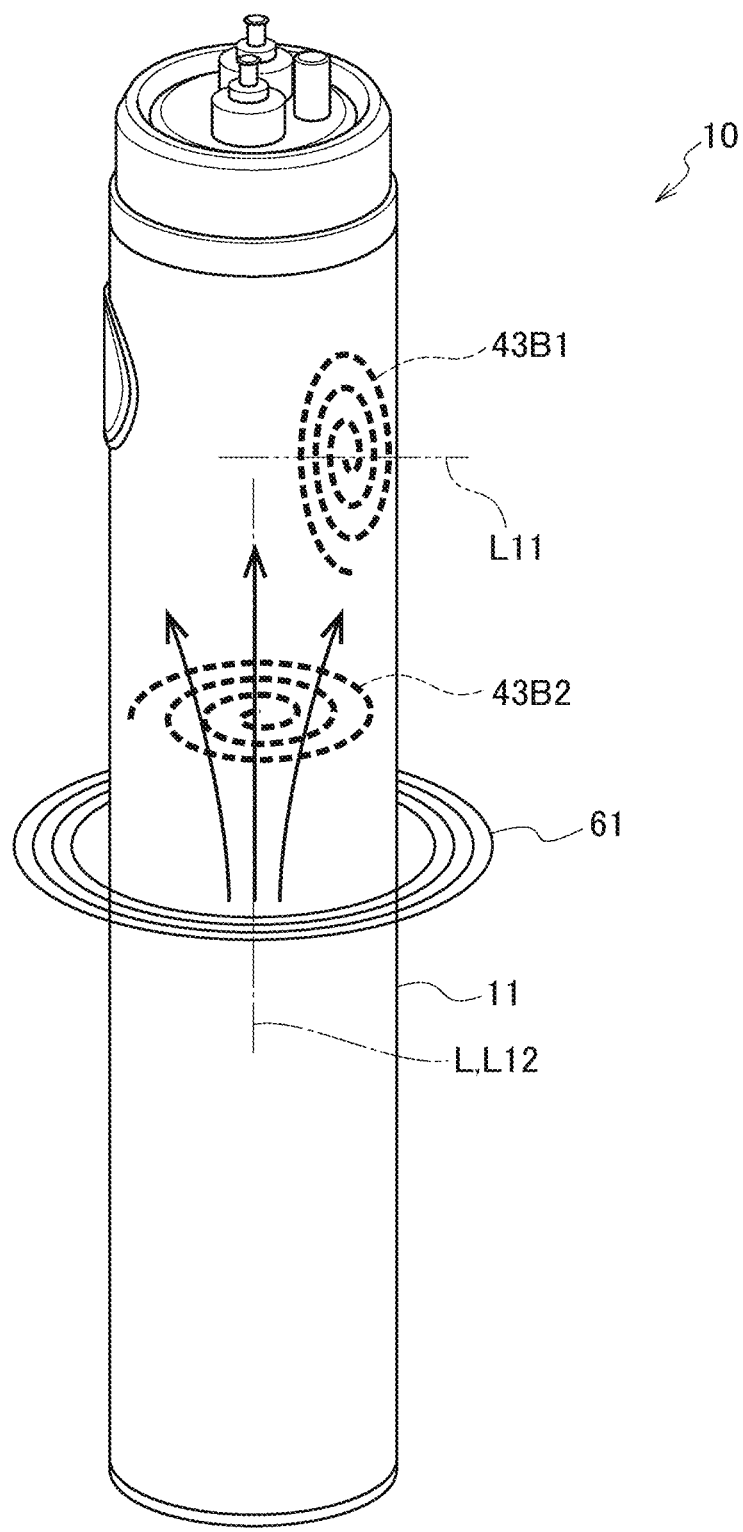
FIG. 13A is a perspective view schematically showing a state of wireless charging during vertical placement of a power supply unit of the aerosol inhaler shown in FIG. 12.
Figure 13B:
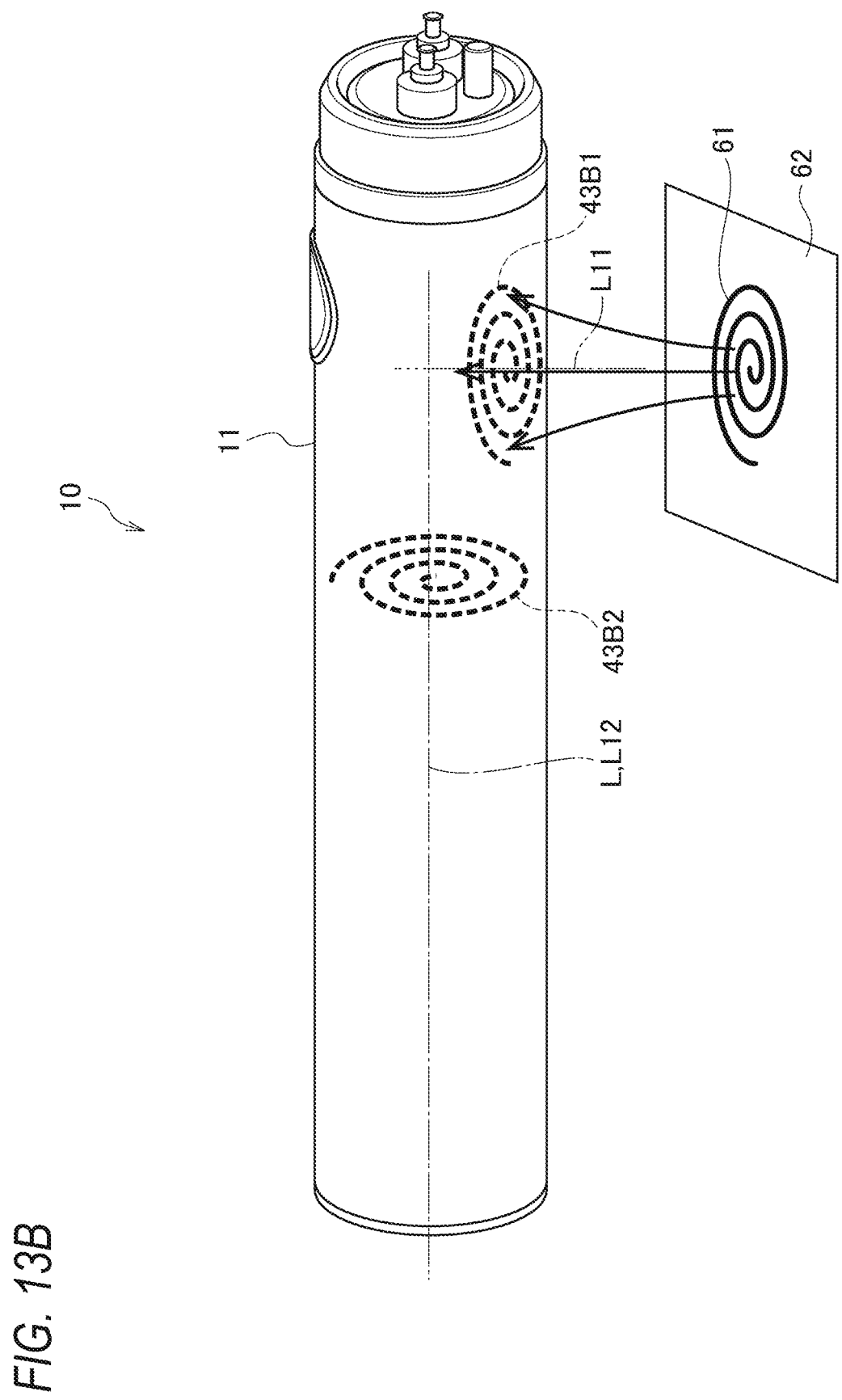
FIG. 13B is a perspective view schematically showing a state of wireless charging during horizontal placement of the power supply unit of the aerosol inhaler shown in FIG. 12.

A circuit configuration applied to the power supply unit 10 according to the second embodiment is not limited to a circuit configuration shown in FIG. 10, and, for example, a circuit configuration shown in FIG. 11 can be applied. The circuit configuration shown in FIG. 11 is different from the circuit configuration shown in FIG. 10 in that the smoothing capacitor 47 for ripple removal is provided on the common DC conductive wire 49 on an input side of the charger 13, and a Zener diode 40 is provided to prevent an excessive voltage from being applied to the charger 13.

Both the smoothing capacitor 47 and the Zener diode 40 are not necessarily provided, and at least one of the smoothing capacitor 47 and the Zener diode 40 may be provided on the common DC conductive wire 49 on the input side of the charger 13. Since the first power reception coil 43B1 and the second power reception coil 43B2 are connected in parallel to at least one of the smoothing capacitor 47 and the Zener diode 40 via the first rectifier 44B1 and the second rectifier 44B2 respectively, at least one of the smoothing capacitor 47 and the Zener diode 40 can be made common, and the power supply unit 10 can be further prevented from increasing in size, weight and cost. Since the first rectifier 44B1 and the second rectifier 44B2 are connected in parallel to at least one of the smoothing capacitor 47 and the Zener diode 40, circuit elements can be made more common.

At least one of the smoothing capacitor 47 and the Zener diode 40 is configured to be capable of supplying power with which the charger 13 can operate normally in both a case where the first power reception coil 43B1 receives the power in a wireless manner and a case where the second power reception coil 43B2 receives the power in a wireless manner. Specifically, capacity of the smoothing capacitor 47 is set based on one, having a larger ripple, of the power supplied from the first power reception coil 43B1 and the power supplied from the second power reception coil 43B2. A Zener voltage of the Zener diode 40 is set based on one, having a higher transient voltage or a higher steady voltage, of the power supplied from the first power reception coil 43B1 and the power supplied from the second power reception coil 43B2. In this way, even when only the smoothing capacitor 47 is used or only the Zener diode 40 is used, the charger 13 can be appropriately protected while the size and weight of the power supply unit 10 can be reduced.

In the power supply unit 10 according to the second embodiment, as shown in FIG. 8, a first shield 81B1 and a second shield 81B2 are provided behind the first power reception coil 43B1 and the second power reception coil 43B2, and protect the circuit elements from leakage magnetic fields of the first power reception coil 43B1 and the second power reception coil 43B2.

Third Embodiment

As shown in FIGS. 12 to 15, the power supply unit 10 according to the third embodiment is different from that according to the second embodiment in that the first power reception coil 43B1 capable of receiving power in a wireless manner when the power supply unit case 11 is placed horizontally (see FIG. 13B) and the second power reception coil 43B2 capable of receiving power in a wireless manner when the power supply unit case 11 is placed vertically (see FIG. 13A) are provided, and the first power reception coil 43B1 and the second power reception coil 43B2 are arranged adjacent to one end side of the power supply 12, and in that the rectifier 44 is made common.

Specifically, the second power reception coil 43B2 according to the third embodiment is arranged at an intermediate portion of the power supply unit case 11 and in vicinity of the first power reception coil 43B1. When the power supply unit case 11 is placed vertically, the second power reception coil 43B2 arranged at the intermediate portion of the power supply unit case 11 can receive the power by capturing magnetic flux from the ring-shaped power transmission coil 61 surrounding the intermediate portion of the power supply unit case 11. In other words, when the power supply unit 10 according to the third embodiment is charged by the second power reception coil 43B2, a charging stand (not shown) including the power transmission coil 61 through which the power supply unit case 11 can penetrate may be used, and the charging mat 62 in the first embodiment may be used. When the charging mat 62 is used, power transfer is preferably performed by a magnetic resonance method capable of transmitting power over a longer distance than an electromagnetic induction method.

Figure 14:
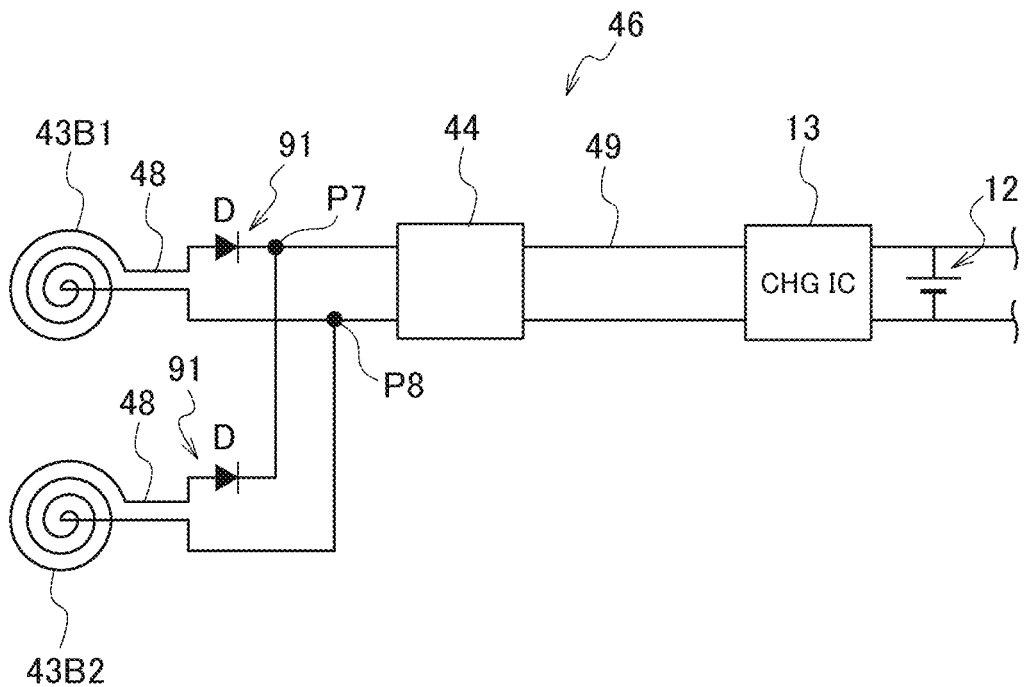
FIG. 14 is a schematic diagram showing a part of a circuit configuration of the power supply unit of the aerosol inhaler shown in FIG. 12.

As shown in FIG. 14, the first power reception coil 43B1 and the second power reception coil 43B2 are connected in parallel to one rectifier 44. More specifically, the AC conductive wire 48 connecting the first power reception coil 43B1 and the rectifier 44 and the AC conductive wire 48 connecting the second power reception coil 43B2 and the rectifier 44 are connected at a seventh connection point P7 and an eighth connection point P8. In this way, since the rectifier 44 can be made common, the power supply unit 10 can be further prevented from increasing in size, weight and cost.

When the first power reception coil 43B1 and the second power reception coil 43B2 are connected in parallel to one rectifier 44, a circuit that connects the first power reception coil 43B1 and the second power reception coil 43B2 is preferably provided with elements 91 that prevents a short circuit between the first power reception coil 43B1 and the second power reception coil 43B2. Specifically, the elements 91 are respectively provided between the first power reception coil 43B1 and the seventh connection point P7 and between the second power reception coil 43B2 and the eighth connection point P8. In this way, a decrease in charging efficiency due to the short circuit between the first power reception coil 43B1 and the second power reception coil 43B2 can be avoided.

The element 91 is preferably a diode D that regulates a current flow direction. Thereby, since the short circuit between the power reception coils 43B1, 43B2 can be prevented by the diode D even without a command from a microcomputer, pins of the microcomputer can be reduced. At least one of two diodes D may be a parasitic diode such as an IGBT instead of a backflow prevention diode.

(First Modification of Circuit Configuration)

Figure 15:
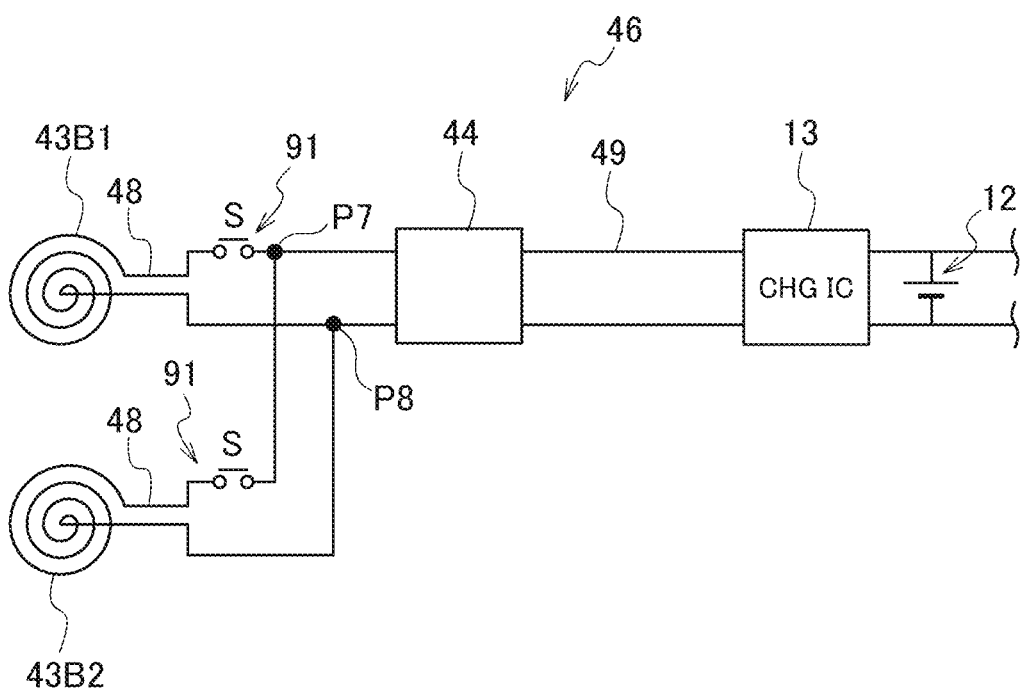
FIG. 15 is a schematic diagram showing a first modification of the part of the circuit configuration of the power supply unit of the aerosol inhaler shown in FIG. 12.

As shown in FIG. 15, instead of the diode D, the element 91 may be a switch S controlled by the control unit 50 to open and close the circuit. In this case, when charging is performed by using the first power reception coil 43B1, the switch S on a second power reception coil 43B2 side is opened, and when charging is performed by using the second power reception coil 43B2, the switch S on a first power reception coil 43B1 side is opened. Thereby, the short circuit between the first power reception coil 43B1 and the second power reception coil 43B2 can be reliably prevented. When the switch S is used, a resistance at the time of passing through the switch S is small, so that the charging efficiency can be improved.

(Second Modification of Circuit Configuration)

Figure 16:
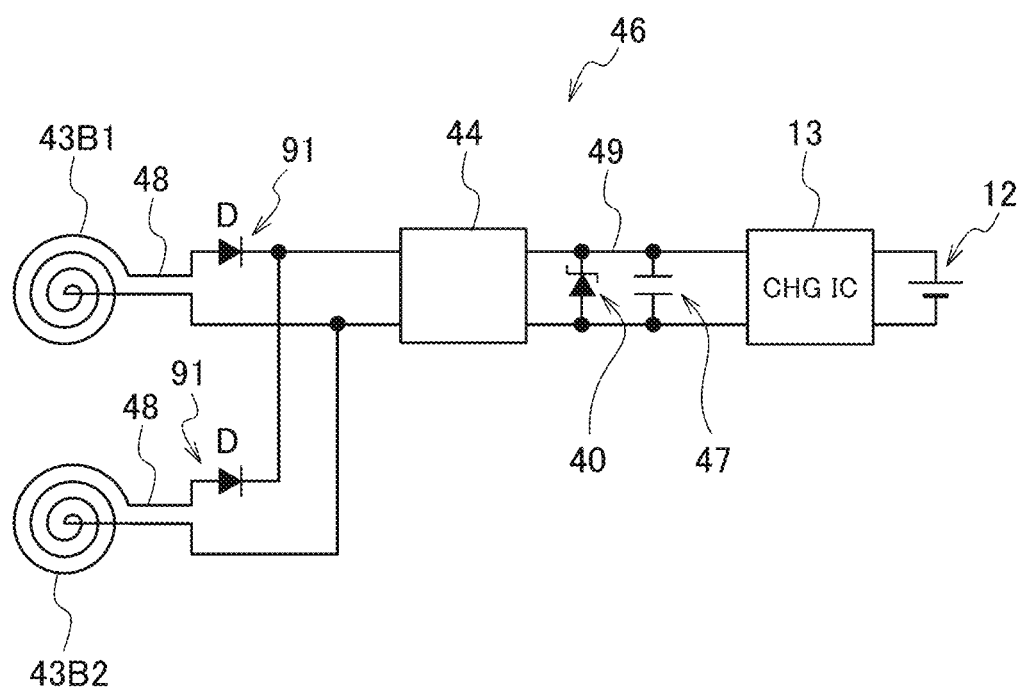
FIG. 16 is a schematic diagram showing a second modification of the part of the circuit configuration of the power supply unit of the aerosol inhaler shown in FIG. 12.

As shown in FIG. 16, also in the power supply unit 10 according to the third embodiment, at least one of the smoothing capacitor 47 for ripple removal and the Zener diode 40 that prevents an excessive voltage from being applied to the charger 13 is preferably provided on the DC conductive wire 49 on an input side of the charger 13. Thereby, the charger 13 can be appropriately protected while the size and weight of the power supply unit 10 can be reduced.

The present invention is not limited to the above embodiments, and can be appropriately modified, improved and the like.

For example, the power reception coil may be configured two-dimensionally or three-dimensionally. For example, when the power supply unit case has a curved portion with at least a part rounded, the first power reception coil may be arranged such that at least a part thereof faces the curved portion of the power supply unit case, and may have a curvature other than 0. In this way, since the first power reception coil for horizontal placement has the curvature, a diameter of the first power reception coil can be increased due to the curvature, and the charging efficiency during horizontal placement can be increased. Further, by effectively utilizing a space in the power supply unit case, the power supply unit case can be prevented from increasing in size.

The present specification describes at least the following matters. Although corresponding constituent elements or the like in the above embodiment are shown in parentheses, the present invention is not limited thereto.

(1) A power supply unit (power supply unit 10) for an aerosol inhaler (aerosol inhaler 1) including: a power supply (power supply 12) capable of supplying power to a load (load 21) capable of generating aerosol from an aerosol source; and a housing (power supply unit case 11) accommodating the power supply, in which the housing accommodates at least one power reception coil (power reception coil 43) capable of receiving the power in a wireless manner in both a case where the housing is placed horizontally and a case where the housing is placed vertically.

According to (1), since the power reception coil can receive the power in the wireless manner in both the case where the housing is placed horizontally and the case where the housing is placed vertically, a user does not need to care about an orientation of the housing when wireless charging is performed.

(2) The power supply unit for the aerosol inhaler according to (1), in which the power reception coil is arranged obliquely with respect to a central axis (center line L) of the housing in a length direction.

According to (2), since the power reception coil is arranged obliquely with respect to the central axis of the housing in the length direction, the wireless charging can be performed in both vertical placement and horizontal placement. In other words, the wireless charging can be performed in both vertical placement and horizontal placement with the minimum number of circuit elements.

(3) The power supply unit for the aerosol inhaler according to (1), in which the at least one power reception coil includes: a first power reception coil (first power reception coil 43B1) capable of receiving the power in the wireless manner when the housing is placed horizontally, and a second power reception coil (second power reception coil 43B2) separate from the first power reception coil and capable of receiving the power in the wireless manner when the housing is placed vertically.

According to (3), since power reception coils respectively dedicated to horizontal placement and vertical placement are provided, charging can be performed efficiently in both horizontal placement and vertical placement. In other words, a charging speed of the wireless charging can be improved in both vertical placement and horizontal placement.

(4) The power supply unit for the aerosol inhaler according to (3), further including: a charger (charger 13) capable of controlling charging of the power supply, in which the first power reception coil and the second power reception coil are connected in parallel to the charger.

According to (4), since the first power reception coil and the second power reception coil are connected in parallel to the charger, the charger can be made common, and the power supply unit can be prevented from increasing in size, weight and cost.

(5) The power supply unit for the aerosol inhaler according to (4), in which a part of a circuit (DC conductive wire 49) that connects the first power reception coil and the charger and a part of a circuit (DC conductive wire 49) that connects the second power reception coil and the charger are made common.

According to (5), since a part of the circuit that connects the first power reception coil and the charger and a part of the circuit that connects the second power reception coil and the charger are made common, the power supply unit can be further prevented from increasing in size, weight and cost.

(6) The power supply unit for the aerosol inhaler according to any one of (3) to (5), further including: a charger (charger 13) capable of controlling charging of the power supply; and a converter (rectifier 44, inverter 70) connected to the charger and configured to convert AC power into DC power, in which the first power reception coil and the second power reception coil are connected in parallel to the converter.

According to (6), since the first power reception coil and the second power reception coil are connected in parallel to the converter, the converter can be made common, and the power supply unit can be further prevented from increasing in size, weight and cost.

(7) The power supply unit for the aerosol inhaler according to any one of (4) to (6), further including: at least one of a smoothing capacitor (smoothing capacitor 47) and a Zener diode (Zener diode 40) connected to an input side of the charger, in which the first power reception coil and the second power reception coil are connected in parallel to at least one of the smoothing capacitor and the Zener diode.

According to (7), since the first power reception coil and the second power reception coil are connected in parallel to at least one of the smoothing capacitor and the Zener diode, at least one of the smoothing capacitor and the Zener diode can be made common, and the power supply unit can be further prevented from increasing in size, weight and cost.

(8) The power supply unit for the aerosol inhaler according to (7), in which at least one of the smoothing capacitor and the Zener diode is configured to be capable of supplying the power with which the charger can operate normally in both a case where the first power reception coil receives the power in the wireless manner and a case where the second power reception coil receives the power in the wireless manner.

According to (8), since at least one of the smoothing capacitor and the Zener diode is configured according to charging power required to be further improved, even when a single smoothing capacitor or Zener diode is used, the charger can be appropriately protected while the size and weight of the power supply unit can be reduced.

(9) The power supply unit for the aerosol inhaler according to (7), in which capacity of the smoothing capacitor is set based on one, having higher ripple, of the power supplied from the first power reception coil and the power supplied from the second power reception coil, and/or a Zener voltage of the Zener diode is set based on one, having a higher transient voltage or a higher steady voltage, of the power supplied from the first power reception coil and the power supplied from the second power reception coil.

According to (9), even when a single smoothing capacitor or Zener diode is used, the charger can be appropriately protected while the size and weight of the power supply unit can be reduced.

(10) The power supply unit for the aerosol inhaler according to any one of (3) to (9): in which the housing has a curved portion with at least a part rounded, and in which the first power reception coil is arranged such that at least a part thereof faces the curved portion, and has a curvature other than 0.

According to (10), since the power reception coil for horizontal placement has the curvature, a diameter of the power reception coil can be increased due to the curvature, and charging efficiency during horizontal placement can be increased. Further, by effectively utilizing a space in the housing, the housing can be prevented from increasing in size.

(11) The power supply unit for the aerosol inhaler according to any one of (3) to (5), further including: a converter (rectifier 44, inverter 70) configured to convert AC power to DC power, in which the converter includes: a first converter (first rectifier 44B1), and a second converter (second rectifier 44B2) separate from the first converter, in which the first power reception coil and the second power reception coil are arranged apart from each other in the housing, in which the first power reception coil is connected to the first converter, and in which the second power reception coil is connected to the second converter.

According to (11), since two converters are provided when two power reception coils are arranged apart from each other, the AC conductive wire connecting the power reception coil and the converter is shortened, and heat generation that may be caused by a skin effect and influence thereof on the circuit elements can be prevented.

(12) The power supply unit for the aerosol inhaler according to (11), in which the first converter and the second converter are accommodated in the housing, in which the first power reception coil and the first converter are arranged on one end side of the power supply, and in which the second power reception coil and the second converter are arranged on another end side of the power supply.

According to (12), since the first power reception coil and the first converter, and the second power reception coil and the second converter are arranged on opposite sides with the power supply interposed therebetween, the power reception coils can be arranged at optimum positions in vertical placement and horizontal placement.

(13) The power supply unit for the aerosol inhaler according to (11) or (12), further including: a charger (charger 13) capable of controlling charging of the power supply; and at least one of a smoothing capacitor (smoothing capacitor 47) and a Zener diode (Zener diode 40) connected to an input side of the charger, in which the first converter and the second converter are connected in parallel to at least one of the smoothing capacitor and the Zener diode.

According to (13), since the first converter and the second converter are connected in parallel to at least one of the smoothing capacitor and the Zener diode, the circuit elements can be made common and the size and weight of the power supply unit can be reduced.

(14) The power supply unit for the aerosol inhaler according to any one of (3) to (10), further including: an element that prevents a short circuit between the first power reception coil and the second power reception coil.

According to (14), since the element that prevents the short circuit between the first power reception coil and the second power reception coil is provided, a decrease in the charging efficiency due to the short circuit can be avoided. In addition, when one of the first power reception coil and the second power reception coil receives the power, the other coil can be appropriately protected.

(15) The power supply unit for the aerosol inhaler according to (14), in which the element is a switch.

According to (15), By disconnecting the circuit with the switch, the short circuit between the first power reception coil and the second power reception coil can be reliably prevented. In addition, since a resistance at the time of passing through the switch is small, the charging efficiency is improved. Further, when one of the first power reception coil and the second power reception coil receives the power, the other coil can be appropriately protected.

(16) The power supply unit for the aerosol inhaler according to (14), in which the element is a diode (diode D).

According to (16), since the short circuit between the coils is prevented by the diode, the short circuit between the coils can be prevented even without a command from a microcomputer, and pins of the microcomputer can be reduced. Further, when one of the first power reception coil and the second power reception coil receives the power, the other coil can be appropriately protected.

(17) The power supply unit for the aerosol inhaler according to any one of (6), (11) to (13): in which the converter is a rectifier or an inverter.

According to (17), since the converter can be the rectifier (rectifier 44) or the inverter (inverter 70) having high versatility, manufacturing cost can be reduced.

What is claimed is:

1. A power supply unit for an aerosol inhaler, comprising:
   a power supply capable of supplying power to a load capable of generating aerosol from an aerosol source; and
   a housing accommodating the power supply,
   wherein the housing accommodates at least one power reception coil capable of receiving the power in a wireless manner in both a case where the housing is placed horizontally and another case where the housing is placed vertically, and
   wherein the at least one power reception coil includes
   a first power reception coil capable of receiving the power in the wireless manner when the housing is placed horizontally, and
   a second power reception coil separate from the first power reception coil and capable of receiving the power in the wireless manner when the housing is placed vertically,
   wherein the power supply unit further includes
   a charger capable of controlling charging of the power supply; and
   a Zener diode connected to an input side of the charger, wherein the Zener diode is capable of preventing an excessive voltage from being applied to the charger,
   wherein the first power reception coil and the second power reception coil are connected in parallel to the charger, and
   wherein the first power reception coil and the second power reception coil are connected in parallel to the Zener diode,
   wherein the power supply unit further comprises a converter configured to convert AC power to DC power,
   wherein the converter includes:
   a first converter, and
   a second converter separate from the first converter,
   wherein the first power reception coil and the second power reception coil are arranged apart from each other in the housing,
   wherein the first power reception coil is connected to the first converter,
   wherein the second power reception coil is connected to the second converter,
   wherein the first converter and the second converter are accommodated in the housing,
   wherein the first power reception coil and the first converter are arranged on one end side of the power supply, and
   wherein the second power reception coil and the second converter are arranged on another end side of the power supply.

2. The power supply unit for the aerosol inhaler according to claim 1,
   wherein a part of a circuit that connects the first power reception coil and the charger and a part of a circuit that connects the second power reception coil and the charger are made common.

3. The power supply unit for the aerosol inhaler according to claim 1, further comprising:
   a charger capable of controlling charging of the power supply; and
   a converter connected to the charger and configured to convert AC power into DC power,
   wherein the first power reception coil and the second power reception coil are connected in parallel to the converter.

4. The power supply unit for the aerosol inhaler according to claim 3:
   wherein the converter is a rectifier or an inverter.

5. The power supply unit for the aerosol inhaler according to claim 1,
   wherein at least one of the smoothing capacitor and the Zener diode is configured to be capable of supplying the power with which the charger can operate normally in both a case where the first power reception coil receives the power in the wireless manner and a case where the second power reception coil receives the power in the wireless manner.

6. The power supply unit for the aerosol inhaler according to claim 1,
   wherein capacity of the smoothing capacitor is set based on one, having higher ripple, of the power supplied from the first power reception coil and the power supplied from the second power reception coil, and/or a Zener voltage of the Zener diode is set based on one, having a higher transient voltage or a higher steady voltage, of the power supplied from the first power reception coil and the power supplied from the second power reception coil.

7. The power supply unit for the aerosol inhaler according to claim 1:
   wherein the housing has a curved portion with at least a part rounded, and
   wherein the first power reception coil is arranged such that at least a part thereof faces the curved portion, and has a curvature other than 0.

8. The power supply unit for the aerosol inhaler according to claim 1, further comprising:
   a charger capable of controlling charging of the power supply; and
   at least one of a smoothing capacitor and a Zener diode connected to an input side of the charger,
   wherein the first converter and the second converter are connected in parallel to at least one of the smoothing capacitor and the Zener diode.

9. The power supply unit for the aerosol inhaler according to claim 1, further comprising:
   an element that prevents a short circuit between the first power reception coil and the second power reception coil.

10. The power supply unit for the aerosol inhaler according to claim 9,
    wherein the element is a switch.

11. The power supply unit for the aerosol inhaler according to claim 9,
    wherein the element is a diode.

* * * * *